(12) United States Patent
Stauber

(10) Patent No.: US 11,084,658 B2
(45) Date of Patent: Aug. 10, 2021

(54) DEVICE AND METHOD FOR TURNING, OPENING AND FILLING TRANSPORT BAGS CONVEYED IN A SUSPENDED MANNER

(71) Applicant: FERAG AG, Hinwil (CH)

(72) Inventor: Erwin Stauber, Grüt (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 16/481,218

(22) PCT Filed: Jan. 25, 2018

(86) PCT No.: PCT/IB2018/050445
§ 371 (c)(1),
(2) Date: Jul. 26, 2019

(87) PCT Pub. No.: WO2018/142242
PCT Pub. Date: Aug. 9, 2018

(65) Prior Publication Data
US 2019/0367282 A1     Dec. 5, 2019

(30) Foreign Application Priority Data

Jan. 31, 2017 (CH) ................................. CH00110/17
Jun. 20, 2017 (CH) ................................. CH00796/17

(51) Int. Cl.
   *B65G 17/20*    (2006.01)
   *B65G 47/61*    (2006.01)
   *B65G 17/48*    (2006.01)

(52) U.S. Cl.
CPC ........... *B65G 17/485* (2013.01); *B65G 17/20* (2013.01); *B65G 47/61* (2013.01); *B65G 2201/0238* (2013.01)

(58) Field of Classification Search
None
See application file for complete search history.

(56) References Cited

U.S. PATENT DOCUMENTS 2,609,082 A     9/1952    Leach
2,643,761 A     6/1953    Wagner et al.
(Continued)

FOREIGN PATENT DOCUMENTS

AT       520412 A1    3/2019
DE     1175153 B     7/1964
(Continued)

OTHER PUBLICATIONS

International Preliminary Report on Patentability, Form PCT/IB/373 for International Application PCT/IB2018/050445, dated Apr. 30, 2018 (1 page).
(Continued)

*Primary Examiner* — Kavel Singh
(74) *Attorney, Agent, or Firm* — Pauley Erickson & Swanson

(57) ABSTRACT

A conveying unit (10) for the suspended transport of transport elements (40) in a conveyor system, in particular a rail-guided (86) conveyor system or a conveyor-chain system, includes a support hook (21) attached to a conveying element (20), in particular a carriage or a conveyor-chain link, a transport element (40), and a suspension hook (41) attached to the transport element, wherein the suspension hook is mounted in a suspended manner in the support hook. The support hook is configured such that the suspension hook can take up two stable positions (61, 62) in the support hook. The suspension hook (41) in a first stable position (61) has been turned through an angle with respect to the suspension hook in a second stable position (62).

40 Claims, 24 Drawing Sheets

(56) References Cited

U.S. PATENT DOCUMENTS

| | | | |
|---|---|---|---|
| 2,992,721 A | 7/1961 | Eger | |
| 4,508,484 A | 4/1985 | Heiz | |
| 5,125,500 A | 6/1992 | Cailbault | |
| 5,799,769 A * | 9/1998 | Heer | B65G 19/025 198/349 |
| 7,080,727 B1 * | 7/2006 | Sanderson | B65G 9/00 198/465.4 |
| 8,151,973 B2 * | 4/2012 | Borkiewicz | A22C 15/001 198/465.4 |
| 9,815,635 B2 * | 11/2017 | Sieksmeier | B65G 1/0457 |
| 10,005,616 B2 * | 6/2018 | Fenile | B65G 9/004 |
| 10,112,783 B2 * | 10/2018 | Stauber | B65G 33/26 |
| 2003/0106774 A1 | 6/2003 | Muller | |
| 2010/0089722 A1 * | 4/2010 | Wiedemann | B65G 9/002 198/465.4 |
| 2012/0037272 A1 | 2/2012 | Wend et al. | |
| 2015/0225177 A1 | 8/2015 | Schönenberger | |
| 2017/0088302 A1 | 3/2017 | Auf Der Maur | |
| 2017/0341864 A1 | 11/2017 | Stauber | |
| 2017/0369248 A1 | 12/2017 | Fenile | |
| 2018/0208407 A1 | 7/2018 | Ruge et al. | |
| 2018/0215547 A1 | 8/2018 | Fenile et al. | |
| 2018/0244471 A1 | 8/2018 | Keller et al. | |
| 2018/0244488 A1 | 8/2018 | Keller et al. | |
| 2018/0312341 A1 | 11/2018 | Keller et al. | |
| 2018/0354728 A1 | 12/2018 | Sigrist | |
| 2020/0024074 A1 | 1/2020 | Herzog-Lang et al. | |
| 2020/0189846 A1 | 6/2020 | Sutter | |

FOREIGN PATENT DOCUMENTS

| | | |
|---|---|---|
| DE | 1 940 256 A1 | 2/1971 |
| DE | 3605317 C1 | 2/1987 |
| DE | 195 04 879 A1 | 8/1996 |
| DE | 103 54 419 A1 | 6/2005 |
| DE | 10 2004 018 569 A1 | 11/2005 |
| DE | 10 2008 026 720 A1 | 12/2009 |
| DE | 10 2012 018 925 A1 | 3/2014 |
| DE | 10 2014 203 298 A1 | 8/2015 |
| DE | 20 2017 105 508 U1 | 11/2017 |
| EP | 2 130 968 A1 | 12/2009 |
| EP | 2 196 415 A2 | 6/2010 |
| EP | 2 418 160 A1 | 2/2012 |
| EP | 3 575 246 A1 | 12/2019 |
| FR | 2 647 762 A1 | 12/1990 |
| GB | 2 232 391 A | 12/1990 |
| JP | S46-11228 Y1 | 4/1971 |
| JP | S 5237381 A | 3/1977 |
| JP | S 5241873 U | 3/1977 |
| JP | S 60176868 U | 11/1985 |
| JP | H04-339744 A | 11/1992 |
| SU | 1169904 A1 | 7/1985 |
| WO | WO 2013/053747 A1 | 4/2013 |
| WO | WO 2016/030275 A1 | 3/2016 |
| WO | WO 2018/078098 A1 | 5/2018 |

OTHER PUBLICATIONS

English language version of the Written Opinion of the International Searching Authority, Form PCT/ISA/237 for International Application PCT/IB2018/050445, dated Apr. 30, 2018 (8 pages).

* cited by examiner

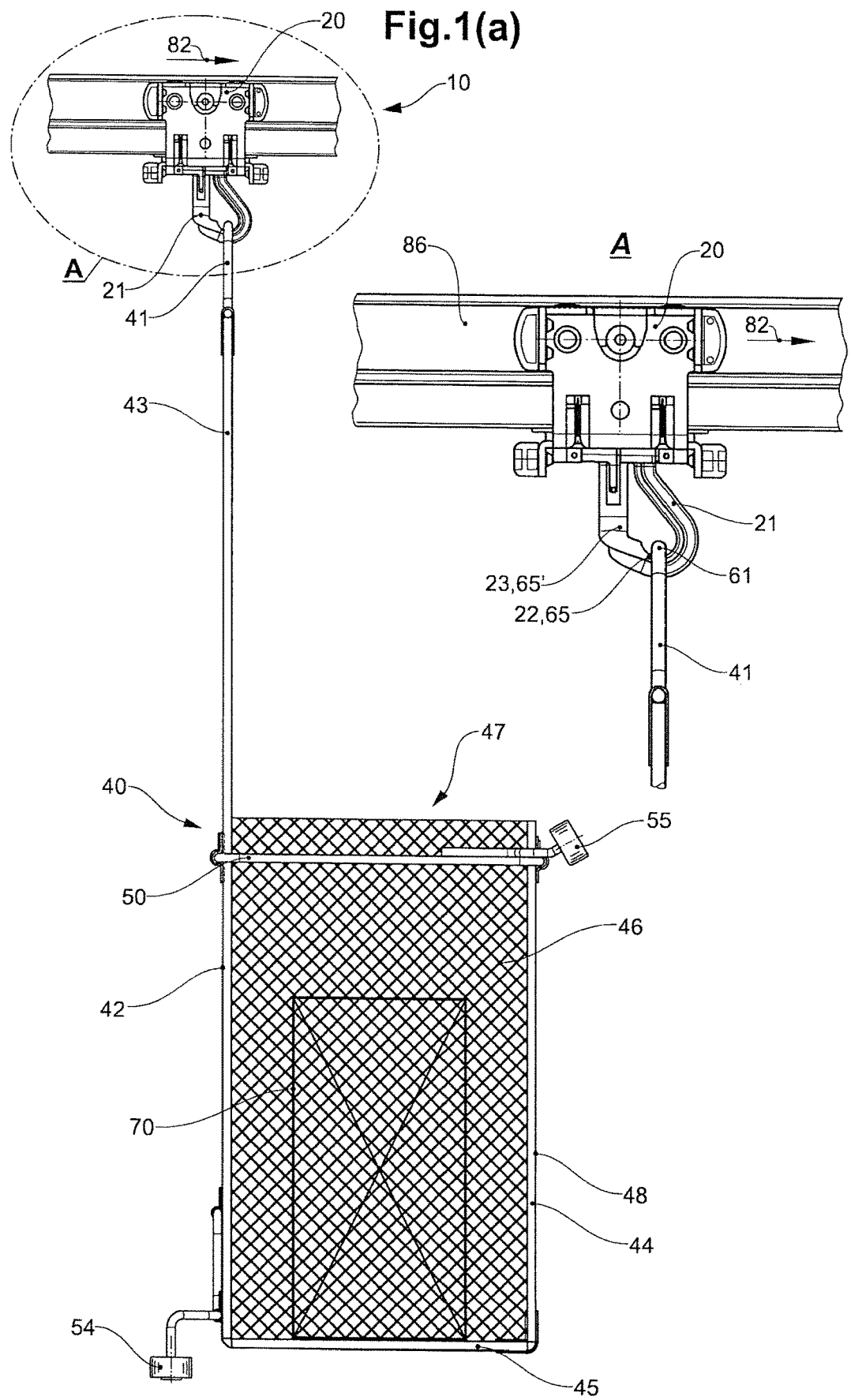

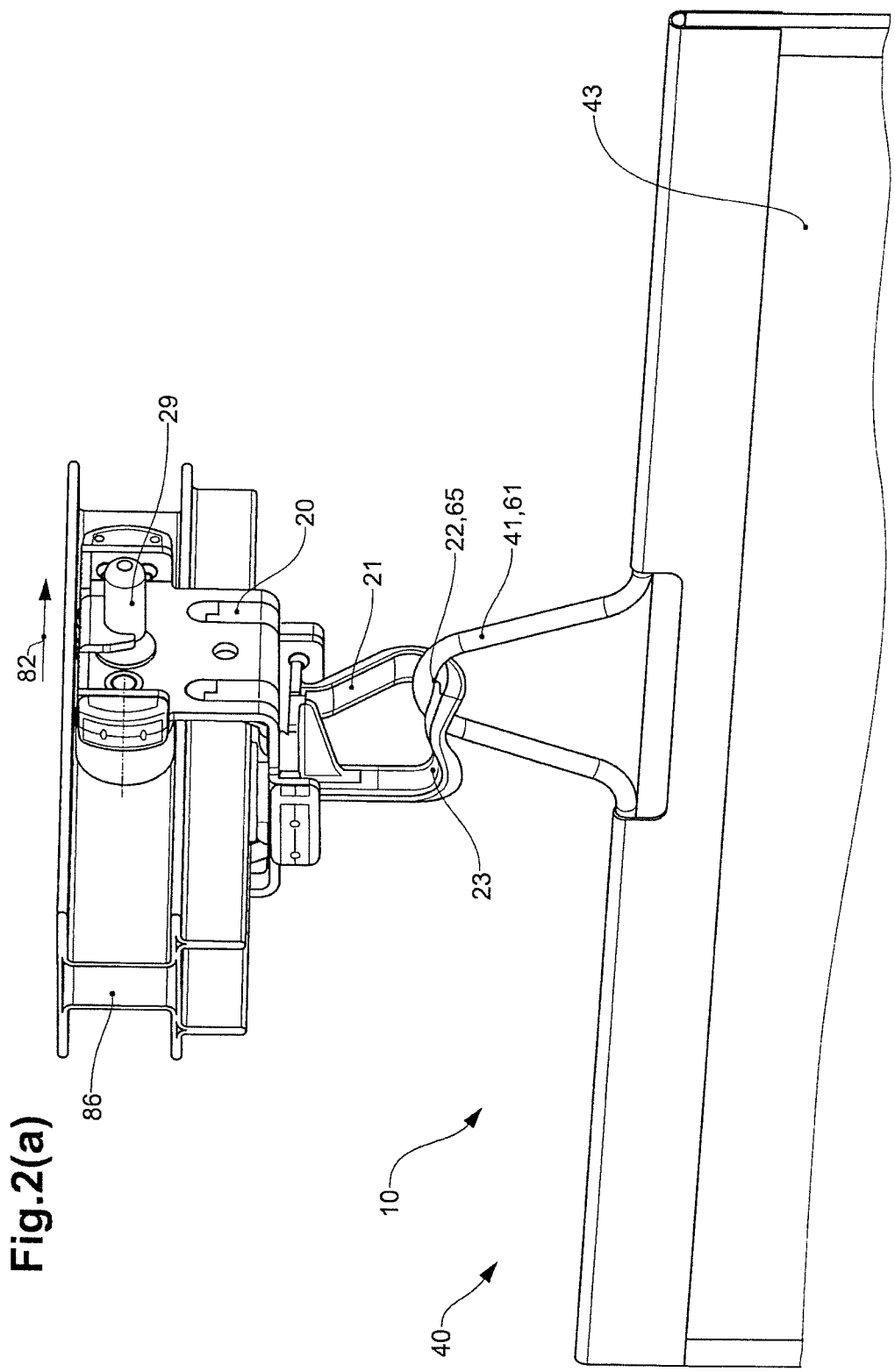

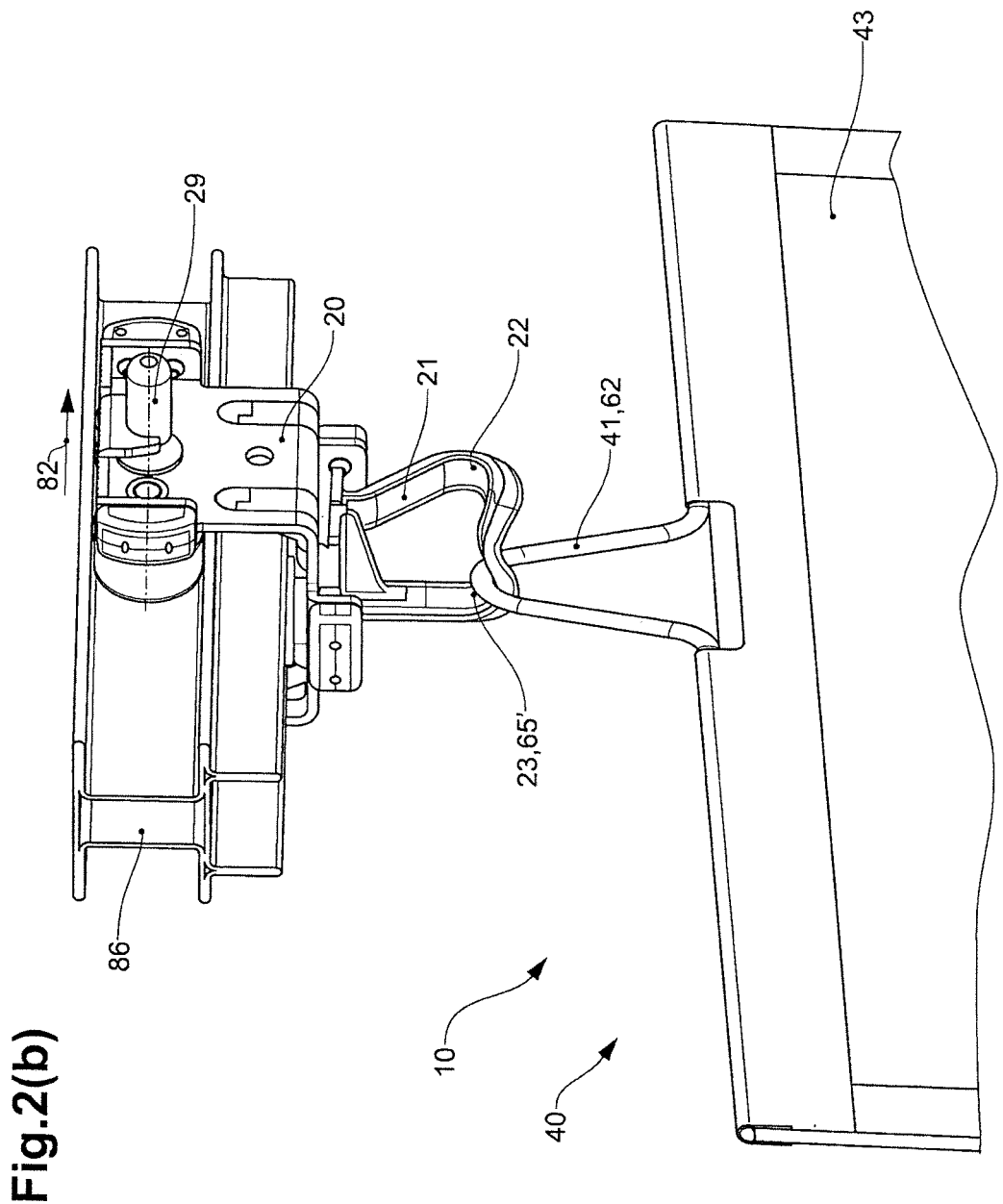

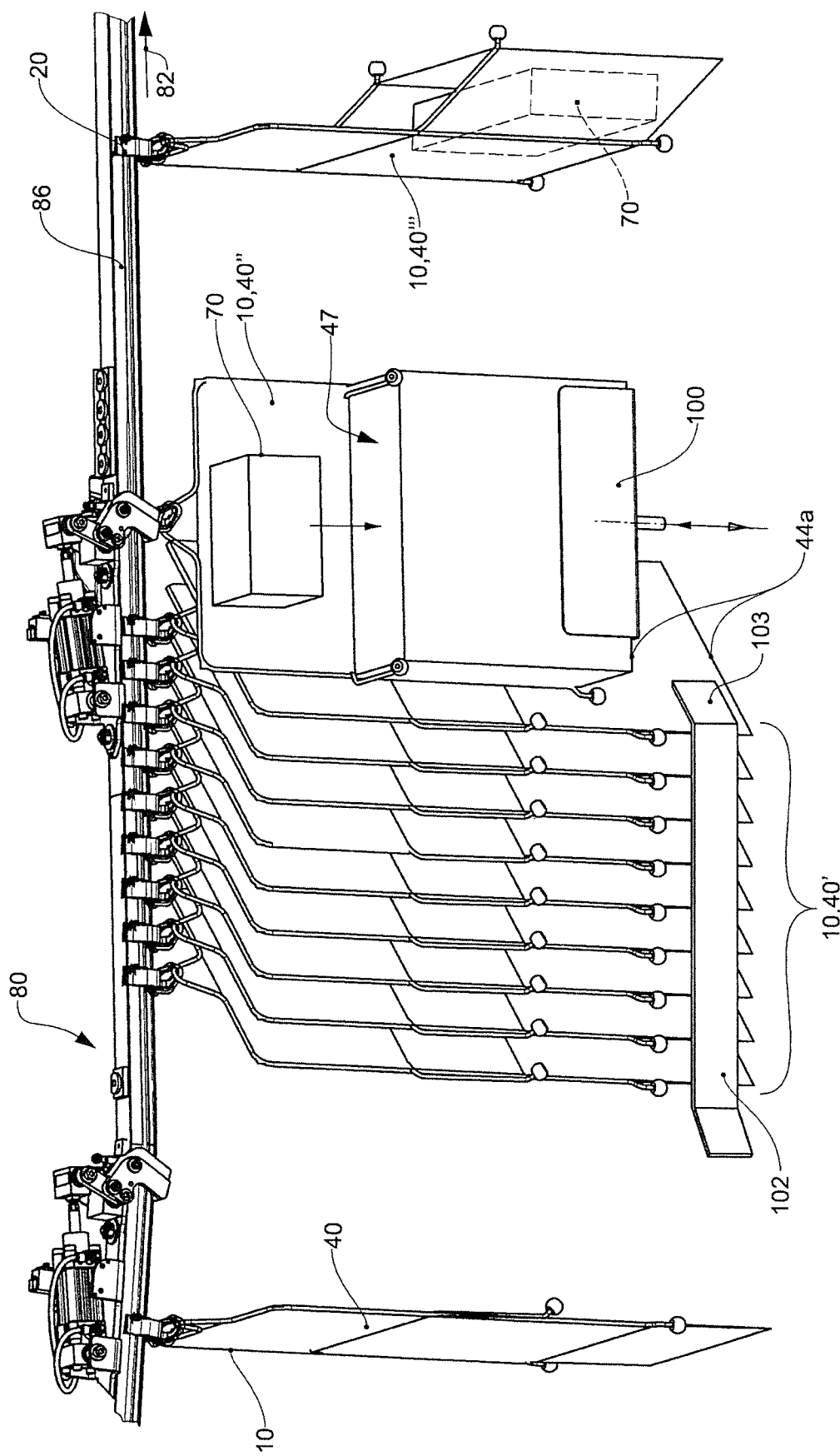

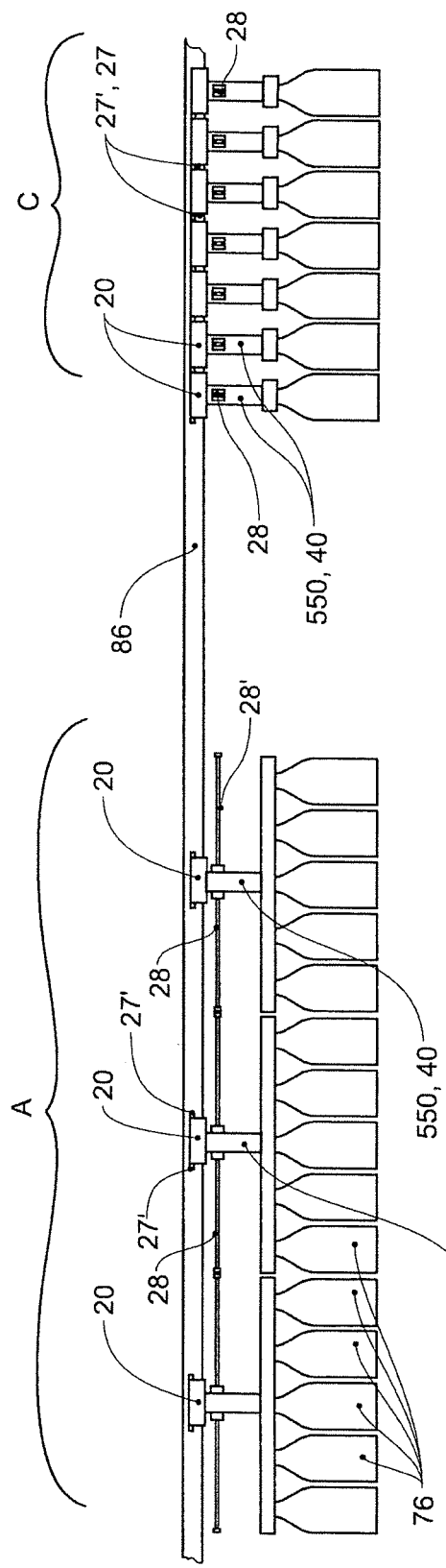
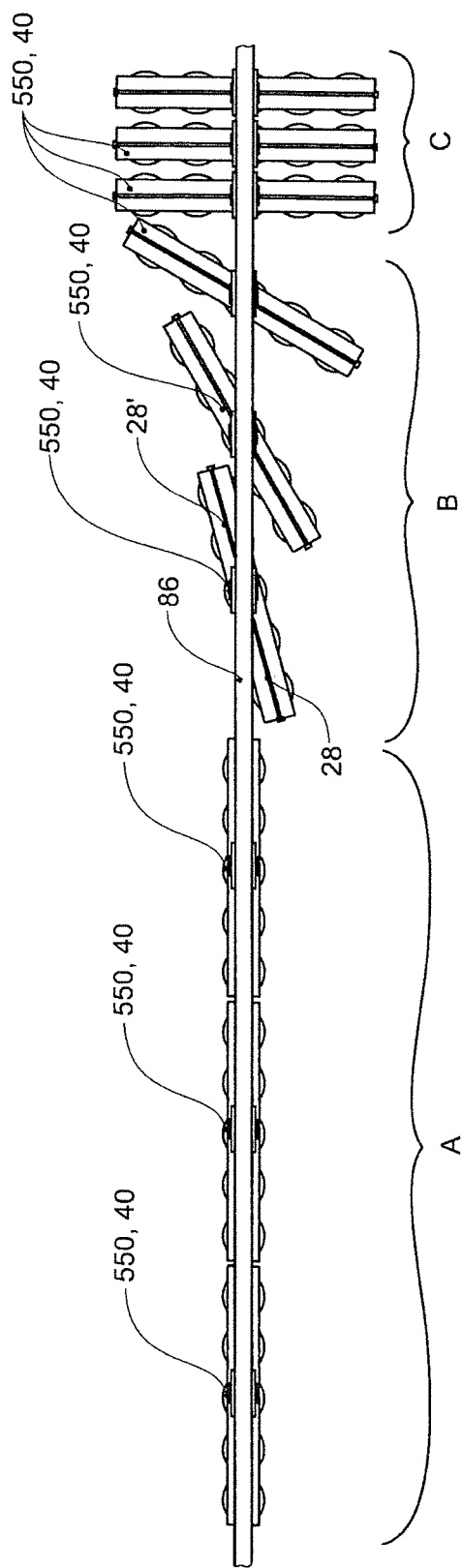

DEVICE AND METHOD FOR TURNING, OPENING AND FILLING TRANSPORT BAGS CONVEYED IN A SUSPENDED MANNER

BACKGROUND OF THE INVENTION

Field of the Invention

The present invention pertains to the field of transport and conveying technology, and relates to a conveying unit for transporting transport elements in a suspended manner, in particular transport bags, clothes hangers, and container holding devices, in a conveying system, in particular a rail-guided conveying system or a conveyor chain system. The present invention further relates to a conveying system having such conveying units, a method for introducing piece goods into transport elements of a conveying system, and a method for visually inspecting clothes hangers, garments hung on clothes hangers, or containers.

Discussion of Related Art

In automated warehouses, large production facilities, and in general in the conveying and transport of goods, suspension conveying systems have proven to be an efficient means for the transport, intermediate buffer storage, and long-term storage of various types of goods. In suspension conveying systems, the goods are either suitably suspended directly on individual conveying elements of a conveying system, for example clothes hangers with garments hung thereon, or introduced into appropriate transport elements such as transport bags, which in turn are mounted in a suspended manner on the conveying elements.

Suspension conveying systems may be implemented as transport chain facilities in which a plurality of conveying elements form links in a chain that is moved along a conveying path.

Also known are gravity-driven conveying systems in which individual conveying elements equipped with wheels move on corresponding rails. One example of such a gravity-driven, rail-guided conveying system is known from WO 2016/030275 A1 by the present applicant.

Suspension conveying systems with transport elements are particularly suited for efficiently conveying heterogeneous piece good articles, for example workpieces in production processes, replacement parts, and consumer goods such as books, clothing, shoes, etc.

Thus, for example, suspension conveying systems may be used in logistics centers of mail order companies for storing a plurality of articles of various sizes and weights, and for picking groups of articles according to the particular customer orders and providing them for shipment.

In this regard, one relevant aspect for a suspension conveying system is simple, smooth, and efficient introduction of goods into empty transport elements and removing the goods from the transport elements.

Manual filling of provided empty transport elements, for example transport bags, allows flexible handling of various goods, but is slow and costly.

EP 2196415 A2 describes a loading station for transport bags that are transported in a suspension conveyor facility. The transport bags in the conveying direction have a reinforced wall with a suspension hook at an upper end that is suspended on a trolley. The wall is oriented transversely with respect to the conveying direction. A fabric web is mounted on a pivotable frame bracket that is attached to the upper end of the wall and is mounted on the lower end of the wall, thus forming a bag that is open at the side. An empty transport bag is supplied vertically from the top via a feed drive. The pocket is brought into an open state via corresponding lateral guide elements on the frame bracket and on the lower end of the wall, and is filled via a conveyor belt and a chute. The filled transport bag is subsequently carried away. During the filling operation, a transport bag must be laboriously guided by two corners, which limits the throughput and increases the structural volume of the device.

DE 102004018569 A1 discloses another device for loading transport bags in a suspension conveyor facility. The transport bags have a frame bracket, suspended on a conveying element transverse to the conveying direction, which defines an upper opening of the pocket. A flexible fabric web fastened to the frame bracket at two ends forms a bag for receiving piece good elements. Side walls enclose only a lower portion of the sides of the bag, so that lateral insertion openings remain. When the transport bags are moved along the conveying path by the device, appropriately designed connecting links move the frame bracket, which is vertically suspended in the empty state of the transport bag, into a horizontal position in which the lateral insertion openings are open to a maximum extent. The articles may now be manually tossed into the pocket through the lateral openings. Automatic filling is not possible, since the upper openings of the pockets are not accessible due to the rail of the conveying system.

EP 2418160 A1 discloses another loading station for transport bags that are transported in a suspension conveyor facility. The transport bags have a frame bracket that is suspended on a conveying element; two ends of a flexible fabric web are fastened to the frame bracket and form a bag. A pressure plate is situated below the suspension hook of the bag. A runner is situated in the loading station, and when a transport bag is moved through the loading station, the runner pushes the pressure plate, and thus also the transport bag, from an orientation transverse to the conveying direction into an orientation parallel to the conveying direction, and holds them in this orientation over the course of the runner. The shape of the suspension hook is selected in such a way that it is pushed upwardly in the support hook of the conveying element, away from a point where the potential energy is at a minimum. At the same time, the frame bracket is also pushed outwardly, perpendicularly with respect to the conveying direction, and assumes a position in which the bag is open at the top. In this position, the transport bag may be filled from the side, through the upper opening. After leaving the area of the runner, the suspension hook slides back on the support hook to the point where the potential energy is at a minimum, and the pocket swivels back into an orientation transverse to the conveying direction.

DE 102012018925 A1 discloses yet another loading station for transport bags that are transported in a suspension conveyor facility. The transport bags have a rear wall that is suspended on a conveying element transverse to the conveying direction, as well as a front wall and a base. Upon passing through the loading station, two ramps press lateral wing areas of the rear wall of the transport bag upwardly, so that ultimately the pocket with the horizontal rear wall moves in the conveying direction. The goods may now be laterally inserted into the pocket through the open sides, or may be tossed in through the upper opening of the pocket, opposite the conveying direction.

There is a general need for improvements in this field of technology.

SUMMARY OF THE INVENTION

It is an object of the invention to provide a conveying unit for transporting transport elements in a suspended manner, in particular a rail-guided conveying system or a conveyor chain system, which allows simple and efficient filling of the transport elements, and/or allows a simple visual inspection.

A further object of the invention is to provide a corresponding conveying system.

Yet a further object of the invention is to provide a method for introducing piece goods into transport elements of a conveying system.

A further object of the invention is to provide a method for visually inspecting clothes hangers, garments hung on clothes hangers, or containers.

These and other objects are achieved by a conveying unit according to the invention, a conveying system according to the invention, and the method according to the invention according to the independent claims. Further preferred embodiments are set forth in the dependent claims.

A conveying unit according to the invention for transporting transport elements in a suspended manner, in particular a rail-guided conveying system or a conveyor chain system, comprises a support hook that is mounted on a conveying element, in particular a carriage or a conveyor chain link, a transport element, and a suspension hook that is mounted on the transport element, wherein the suspension hook is supported in the support hook in a suspended manner. The support hook is designed in such a way that the suspension hook can assume at least two stable positions in the support hook, wherein the suspension hook in a first stable position is rotated about an angle relative to the suspension hook into a second stable position.

The support hook and/or the suspension hook may be designed as closed eyes, or as open or reversibly closable hooks.

The suspension hook is advantageously transferable back and forth between the first stable position and the second stable position in such a way that the suspension hook continuously rests on the support hook.

Alternatively or additionally, the support hook has a first bearing segment and a second bearing segment; in the first stable position the suspension hook rests on the first segment, and in the second stable position rests on the second segment, and situated between the first segment and the second segment is a connecting segment on which the suspension hook is slidingly transferable back and forth between the first stable position and the second stable position.

In a conveying unit according to the invention, the support hook advantageously has a first bearing segment and a second bearing segment, wherein the support hook is designed in such a way that in a given first spatial orientation of the support hook, the suspension hook may assume a first stable position on the first bearing segment, in which the suspension hook is oriented in a first plane; and in a given second spatial orientation of the support hook, which may be the same as or different from the first spatial orientation, the suspension hook may assume a second stable position on the second bearing segment, in which the suspension hook is oriented in a second plane, wherein the suspension hook is transferable back and forth between the first position and the second position.

In such a conveying unit, the support hook is advantageously designed in such a way that in a given spatial orientation of the support hook, the suspension hook may assume the first stable position on the first bearing segment, in which the suspension hook is oriented in the first plane; and in the same spatial orientation of the support hook, the suspension hook may assume the second stable position on the second bearing segment, in which the suspension hook is oriented in the second plane, wherein the first position and the second position correspond to local minima of the potential energy of the transport element that is supported in a suspended manner, and wherein the suspension hook is transferable back and forth between the first stable position and the second stable position by rotating the suspension hook about a given rotational angle.

The rotational angle of the suspension hook is advantageously between 0 and 180°, more advantageously between 45° and 135°, and particularly advantageously between 80° and 100°.

In one alternative advantageous embodiment, in such a conveying unit the support hook is designed in such a way that in a given first spatial orientation of the support hook, the suspension hook may assume the first stable position on the first bearing segment, in which the suspension hook is oriented in the first plane; and in a second spatial orientation of the support hook that is different from the given first spatial orientation, the suspension hook may assume the second stable position on the second bearing segment, in which the suspension hook is oriented in the second plane, wherein in the given first spatial orientation of the support hook, the first position corresponds to a minimum of the potential energy of the transport element that is supported in a suspended manner; in the given second spatial orientation of the support hook, the second position corresponds to a minimum of the potential energy of the transport element that is supported in a suspended manner, and the suspension hook is transferable back and forth between the first position and the second position by rotating the support hook about a given rotational angle.

The rotational angle of the support hook is advantageously between 0 and 180°, more advantageously between 30° and 120°, and particularly advantageously between 45° and 90°.

The suspension hook is particularly advantageously transferable back and forth between the first position and the second position by rotating the conveying element about the conveying direction.

In another alternative advantageous embodiment of such a conveying unit, the support hook is designed in such a way that in a given first spatial orientation of the support hook, the suspension hook may assume the first stable position on the first bearing segment, in which the suspension hook is oriented in the first plane, and may also assume the second stable position on the second bearing segment, in which the suspension hook is oriented in the second plane, wherein in the given first spatial orientation of the support hook, the first position corresponds to a minimum of the potential energy of the transport element that is supported in a suspended manner, and wherein in the second spatial orientation, the first position and the second position correspond to local minima of the potential energy of the transport element that is supported in a suspended manner, and wherein the suspension hook is transferable back and forth between the first stable position and the second stable position by rotating the suspension hook about a given rotational angle.

The rotational angle of the support hook is advantageously between 0 and 180°, more advantageously between 30° and 120°, and particularly advantageously between 45° and 90°.

The suspension hook is particularly advantageously transferable from the second position into the first position by rotating the conveying element about the conveying direction.

In the above-mentioned conveying units, the transport element is advantageously a container with at least one stable wall.

The transport element of a conveying unit may be a transport bag.

Alternatively, the transport elements may have some other design, for example as transport boxes or transport bins, as flexible transport bags, or as lightweight rod assemblies with textile walls stretched in between, etc.

Such a transport bag of a conveying unit particularly advantageously includes a rear wall and a front wall that are flexibly joined together via a base section in such a way that they are movable back and forth between a first state in which they form a pocket that is open and fellable at the top, and a second state in which they are situated close together and form a folded-up bag, wherein the rear wall is extended upwardly beyond the level of the front wall, with a support section for fastening the transport bag to the conveying element, and wherein the suspension hook is mounted on an upper end of the support section.

In addition, the transport bag may have opening means that can automatically bring the transport bag into the first state and hold it there.

In another advantageous conveying unit, at least one spacer element is situated between the front wall and the rear wall of the transport bag and is pivotably connected to the front wall and the rear wall, respectively, wherein the at least one spacer element is designed and arranged in such a way that when the pocket is empty, the transport bag automatically goes from the first state into the second state by gravity.

The transport bag may particularly advantageously be brought from the second state into the first state by raising the front wall.

A spacer element is advantageously situated between the front wall and the rear wall of the transport bag, at a lower end of the front wall and at an upper end of the front wall, on both sides in each case, and is pivotably connected to the front wall and the rear wall, respectively. Such a configuration allows, for example, a flexible design for the base section of a conveying unit.

The spacer elements advantageously have a bend that is directed away from the pocket interior. Such a bent design, for example, increases the usable opening of the pocket, and also increases the mechanical stability.

A transport element of a conveying unit according to the invention advantageously has at least one stop bracket on a rear wall that prevents or hinders swiveling of a spacer element beyond the plane, formed by the rear wall, on the side of the rear wall facing away from the front wall.

The transport element advantageously has at least one second hook.

Alternatively, the transport element of a conveying unit according to the invention may be a clothes hanger, in particular a suspended clothes hanger or a clamping bracket.

Alternatively, the transport element of a conveying unit according to the invention may be a device for holding two or more containers.

Such empty or filled containers may, for example, be liquid containers such as bottles, pressurized containers for gases, containers for aerosol spray cans, or metal cans. However, the stated containers also encompass any other type of container or package for fluids or solid materials, for example bags, sacks, or cartons, or in general, any types of individual objects and products that are mechanically grippable in any manner. The containers may be made of glass, metal, paper, cardboard, or polymer material, etc., depending on the application. Thus, for example, filled and sealed wine bottles, semi-finished goods for the manufacture of spray cans, or potato chip bags, cigarette cartons, sacks containing bulk material, etc., may be conveyed.

Such transport devices according to the invention are thus generally suited for intralogistics in a manufacturing chain and/or warehouse management and/or customer shipping. In particular, such transport devices allow the flexible coupling of successive processing operations in a production chain. For example, if a device for packaging goods has a different processing capacity than an upstream device for manufacturing the goods, a buffer may be provided via such a transport device. Likewise, temporary production downtimes during maintenance activities or exchange of individual facility parts may be compensated for. The individual transport of the conveying units also allows individual processing of fairly small lot sizes.

A conveying system according to the invention for the guided suspended transport of transport elements, in particular transport bags and/or clothes hanger elements, along a conveying path, in particular a rail-guided conveying system or a conveyor chain system, includes at least one of the above-mentioned advantageous conveying units.

In such a conveying system, the first plane, in which the suspension hook is oriented in the first stable position, is essentially transverse to the conveying direction; and the second plane, in which the suspension hook is oriented in the second stable position, is essentially parallel to the conveying direction.

An operative arrangement is advantageously provided in the conveying system, via which the transport elements may be rotated about a given rotational angle at a given location on the conveying path, so that the suspension hook is transferred from the first position into the second position, or from the second position into the first position.

The rearrangement of the transport elements, for example transport bags and clothes hanger elements, advantageously takes place by rotating the transport elements themselves, advantageously about a center axis.

A brush arrangement or a mechanical, electrical, magnetic, or pneumatic actuating means is particularly advantageously provided as an operative arrangement.

Alternatively, in an advantageous conveying system, in one given section of the conveying path the support hook of the conveying unit is oriented in such a way that the suspension hook of the transport element assumes a first stable position, and in another given section the support hook of the conveying unit is oriented in such a way that the suspension hook of the transport element assumes a second stable position.

Transferring the suspension hook from the first stable position into the second stable position, or from the second stable position into the first stable position, is particularly advantageously initiated by rotating the conveying element about the conveying direction during the transition between the one given section and the other given section of the conveying path.

In the above-mentioned conveying systems having transport bags, further opening means may be provided via which a transport bag may be brought into the first open state at a given location on the conveying path, with the suspension hook in the second position and the rear wall of the transport bag oriented essentially parallel to the conveying direction.

A lifting arrangement, in particular a lifting table or a ramp arrangement, is particularly advantageously provided as an opening means.

The opening means may also be designed as a ramp that is arranged in such a way that the base section of an empty pocket is continuously lifted from the ramp during the conveying, so that the transport bag goes into the first, open state.

In another advantageous embodiment of such a conveying system, an opening device is provided as an opening means, comprising a plurality of staggered conveying and lifting devices having a lower roller element, so that the lower roller elements of the opening device form an ascending ramp.

The stated roller ramp allows the lower edge of the front wall to be raised during conveying of an empty transport bag along the conveying path, so that the front wall as a whole is raised, and due to the geometrically specified operative connection via spacer elements and/or the base section, is moved away from the rear wall, thus opening the opening of the pocket. The load, for example a piece good unit, may now be introduced into the pocket.

The conveying and lifting devices particularly advantageously have an upper roller element, so that the lower roller elements and the upper roller elements of the opening device form a conveyor channel.

Such an embodiment offers the advantage that the lower rollers on the one hand can raise the front wall, and on the other hand, together with the upper rollers, form a guide channel for the transport bags, in which the transport bags of the conveying units reliably take a reproducible path. The upper rollers form a stop for the front wall or the rear wall, depending on how the transport bags are oriented in relation to the conveying and lifting units, so that the transversal movement in the direction of the upper rollers is limited.

Additionally or alternatively, the lower roller elements and/or the upper roller elements of the conveying and lifting units may be actively driven. Such an active drive avoids or reduces an undesired braking action of the opening device on the transport bags of the conveying units conveyed therein.

The rotational direction and the rotational speed of the roller elements are advantageously coordinated with the conveying speed at the location of the corresponding roller elements in such a way that the tangential peripheral speed of the roller elements corresponds to the longitudinal conveying speed. This means that the transport bag of a conveying unit is conveyed by the rollers at the same speed and in the same direction as the carriage of the conveying unit. Accordingly, swinging of the transport bags in the longitudinal direction is not possible, and the position of the bag is stabilized, even at high conveying speeds or positive and negative accelerations.

The lower roller elements and the upper roller elements of the conveying and lifting units are advantageously arranged at an angle between 75° and 105° relative to one another, and perpendicular to the conveying direction. The lower roller elements and the upper roller elements are particularly advantageously arranged at a right angle relative to one another. In one particularly advantageous embodiment, the lower roller elements are inclined with respect to the horizontal by an angle between 5° and 30°.

Such an embodiment offers the advantage that, transverse to the conveying direction, the movement of the transport bag in one direction is limited by the upper rollers, and in the other direction is limited by the slightly inclined lower rollers. The transport bags of the conveying units reliably take a reproducible path.

Another option is the use of a ramp-shaped conveyor belt that runs analogously to the ramp mentioned above, but with the advantage that the transport bag is actively carried along at its lower end, so that opening the pocket may take place in a very controlled manner.

In one advantageous conveying system, the opening means may thus include a lower belt conveyor situated in a ramp-shaped manner. This lower belt conveyor, analogously to the lower roller elements discussed above, raises the front wall of the transport bags.

The stated belt conveyor ramp allows the lower edge of the front wall to be raised during conveying of an empty transport bag along the conveying path, so that the front wall as a whole is raised, and due to the geometrically specified operative connection via spacer elements and/or the base section, is moved away from the rear wall, thus opening the opening of the pocket. The load, for example a piece good unit, may now be introduced into the pocket Such an opening means particularly advantageously has an upper belt conveyor, so that the lower belt conveyor and the upper belt conveyor form a conveyor channel.

Such an embodiment offers the advantage that the lower belt conveyor on the one hand can raise the front wall, and on the other hand, together with the upper belt conveyor, forms a guide channel for the transport bags, in which the transport bags of the conveying units reliably take a reproducible path. The upper belt conveyor forms a stop for the front wall or the rear wall, depending on how the transport bags are oriented in relation to the belt conveyor, so that the transversal movement in the direction of the upper belt conveyor is limited.

Additionally or alternatively, the lower belt conveyor and/or the upper belt conveyor may be actively driven. Such an active drive avoids or reduces an undesired braking action of the opening device on the transport bags of the conveying units conveyed therein.

The conveying direction and the conveying speed of the belt conveyors is advantageously the same as the longitudinal conveying speed of the conveying units. This means that the transport bag of a conveying unit is conveyed by belt conveyors at the same speed and in the same direction as the carriage of the conveying unit. Accordingly, swinging of the transport bags in the longitudinal direction is not possible, and the position of the bag is stabilized, even at high conveying speeds or positive and negative accelerations. If the conveying speeds are different at various locations on the conveying path, multiple belt conveyors may also be arranged one behind the other in a staggered manner, and can take these different speeds into account.

The lower belt conveyor and the upper belt conveyor are advantageously arranged at an angle between 75° and 105° relative to one another. The lower belt conveyor and the upper belt conveyor are particularly advantageously arranged at a right angle relative to one another. In one particularly advantageous embodiment, the lower belt conveyor is inclined with respect to the horizontal by an angle between 5° and 30°.

Such an embodiment offers the advantage that, transverse to the conveying direction, the movement of the transport bag in one direction is limited by the upper belt conveyor, and in the other direction is limited by the slightly inclined lower belt conveyor. The transport bags of the conveying units reliably take a reproducible path.

The above-mentioned conveying and lifting units and belt conveyor may also be combined in an opening device for a conveying system according to the invention.

In addition, the above-mentioned conveying systems may have a device for introducing piece good units into the open pocket of the transport bag.

A plurality of transport bags arranged in a staggered manner may be provided in a provision section of the conveying path of the conveying system.

The support hooks of the conveying units are advantageously designed in such a way that they allow such a staggered arrangement. The support hooks advantageously have a bearing segment, which in the staggered arrangement of the transport bags allows a stable position of the suspension hooks.

Such staggered arrangements of transport bags may be used anywhere in a conveying system. They may be used for various applications and for fulfilling various functions within a conveying system.

It is also possible to convey and displace entire groups of such transport bags in a staggered arrangement as a whole within the conveying system.

In another conveying system according to the invention for the guided suspended transport of transport bags along a conveying path, in particular a rail-guided conveying system or a conveyor chain system, the conveying system is designed in such a way that a plurality of transport bags may be provided in a staggered arrangement on a given section of the conveying path.

The support hooks of the conveying units are once again advantageously designed so that they allow such a staggered arrangement. The support hooks advantageously have a bearing segment, which in the staggered arrangement of the transport bags allows a stable position of the suspension hooks.

The stated staggered arrangements of transport bags may be used anywhere in the conveying system. They may be used for various applications and for fulfilling various functions within a conveying system.

Entire groups of such transport bags in a staggered arrangement may be conveyed and displaced as a whole within the conveying system.

A method according to the invention for introducing piece goods into transport elements of a conveying system comprises the steps:
  providing a conveying system according to the invention as discussed above;
  supplying a conveying unit of the conveying system along the conveying path, with the suspension hook of the transport element in the first stable position;
  transferring the suspension hook of the transport element of the stated conveying unit from the first stable position into the second stable position;
  introducing at least one piece good unit into the ready-to-receive transport element of the stated conveying unit; and
  transferring the suspension hook of the stated transport element from the second stable position into the first stable position.

In such a method, the conveying units of the conveying system are advantageously one of the above-discussed conveying units according to the invention with a transport bag, wherein in the first position of the suspension hook the rear wall of the transport bag is oriented essentially transversely with respect to the conveying direction, and wherein in the second position of the suspension hook the rear wall of the transport bag is oriented essentially parallel to the conveying direction.

In one of the above-mentioned methods, prior to introducing a piece good unit into the pocket of the transport bag of a conveying unit, the transport bag is particularly advantageously transferred from the second state into the first state.

In the above-mentioned methods, a plurality of transport bags is advantageously provided in a staggered arrangement.

A method according to the invention for visually inspecting garments hung on clothes hanger transport elements of a conveying system or containers held in container holding devices of a conveying system comprises the steps:
  providing a conveying system according to the invention as discussed above;
  supplying a conveying unit of the conveying system along the conveying path, with the suspension hook of the clothes hanger transport element or of the container holding device transport element in the first stable position;
  transferring the suspension hook of the clothes hanger transport element or of the container holding device transport element of the stated conveying unit from the first stable position into the second stable position;
  visually inspecting the front side and/or rear side of a garment hung on the clothes hanger transport element or a container held in the container holding device of the transport element; and
  transferring the suspension hook of the clothes hanger transport element or of the container holding device transport element of the stated conveying unit from the second stable position into the first stable position.

Within the context of the present disclosure, a visual inspection is intended to mean in general any image capture directly by the eyes and/or with optical aids (cameras, etc.), with subsequent evaluation by humans and/or automatic systems.

The stated visual inspection may be advantageous for various applications. For example, the type of returned empty clothes hangers may be determined to allow sorting, or the type or the state of a garment hung on a clothes hanger may be identified or checked. Likewise, the type or the state of the containers may be identified or checked, for example in a production process or a logistics process.

In the above-mentioned method, the conveying units of the conveying system are advantageously conveying units with clothes hanger transport elements or container holding device transport elements, wherein in the first position of the suspension hook the clothes hanger transport element or the container holding device transport element is oriented essentially transversely with respect to the conveying direction, and wherein in the second position of the suspension hook the clothes hanger transport element or the container holding device transport element is oriented essentially parallel to the conveying direction.

In one of the above-mentioned methods, prior to the visual inspection of the front side and/or rear side of a garment hung on the clothes hanger transport element, the clothes hanger transport element is particularly advantageously transferred from the second state into the first state, or prior to the visual inspection of the front side and/or rear side of a container held on the container holding device transport element, the container holding device transport element is transferred from the second state into the first state.

BRIEF DESCRIPTION OF SEVERAL VIEWS OF THE DRAWINGS

Reference is made below to the drawings for better understanding of the present invention. The drawings show embodiments of the inventive subject matter strictly by way of example.

Identical or functionally equivalent parts in the figures and the associated description are provided with the same reference numerals.

FIG. 2 schematically shows a second possible embodiment of a conveying unit according to the invention, in a detail view of the suspension hook supported in the support hook, (a) with the suspension hook in a first stable position essentially transverse to the conveying direction; and (b) with the suspension hook in a second stable position with the suspension hook essentially parallel to the conveying direction.

FIG. 3 schematically shows one possible embodiment of a conveying system according to the invention, with conveying units as shown in FIG. 1, two operating devices for rotating a transport element between two stable positions, and an opening means situated in between.

FIG. 4 schematically shows a further possible embodiment of a conveying system according to the invention, in which a plurality of unfilled transport elements is provided in a staggered arrangement upstream from the opening means.

FIG. 10 schematically shows in a side view the use of conveying units according to the invention, similarly to FIG. 9, wherein in an area A the holding devices of the conveying units are in a stable state parallel to the conveying direction, and in an area C are in a different, second state transverse to the conveying direction.

FIG. 11 schematically shows in a top view the use of conveying units according to the invention, similarly to FIG. 9, wherein in area C the holding devices of the conveying units are in a first stable state transverse to the conveying direction, in a transition area B the holding devices are transferred from the first stable state into the second stable state, or vice versa, by appropriate actuating means, and in an area A the holding devices are in a second stable state parallel to the conveying direction.

DETAILED DESCRIPTION OF THE INVENTION

Figure 1B:
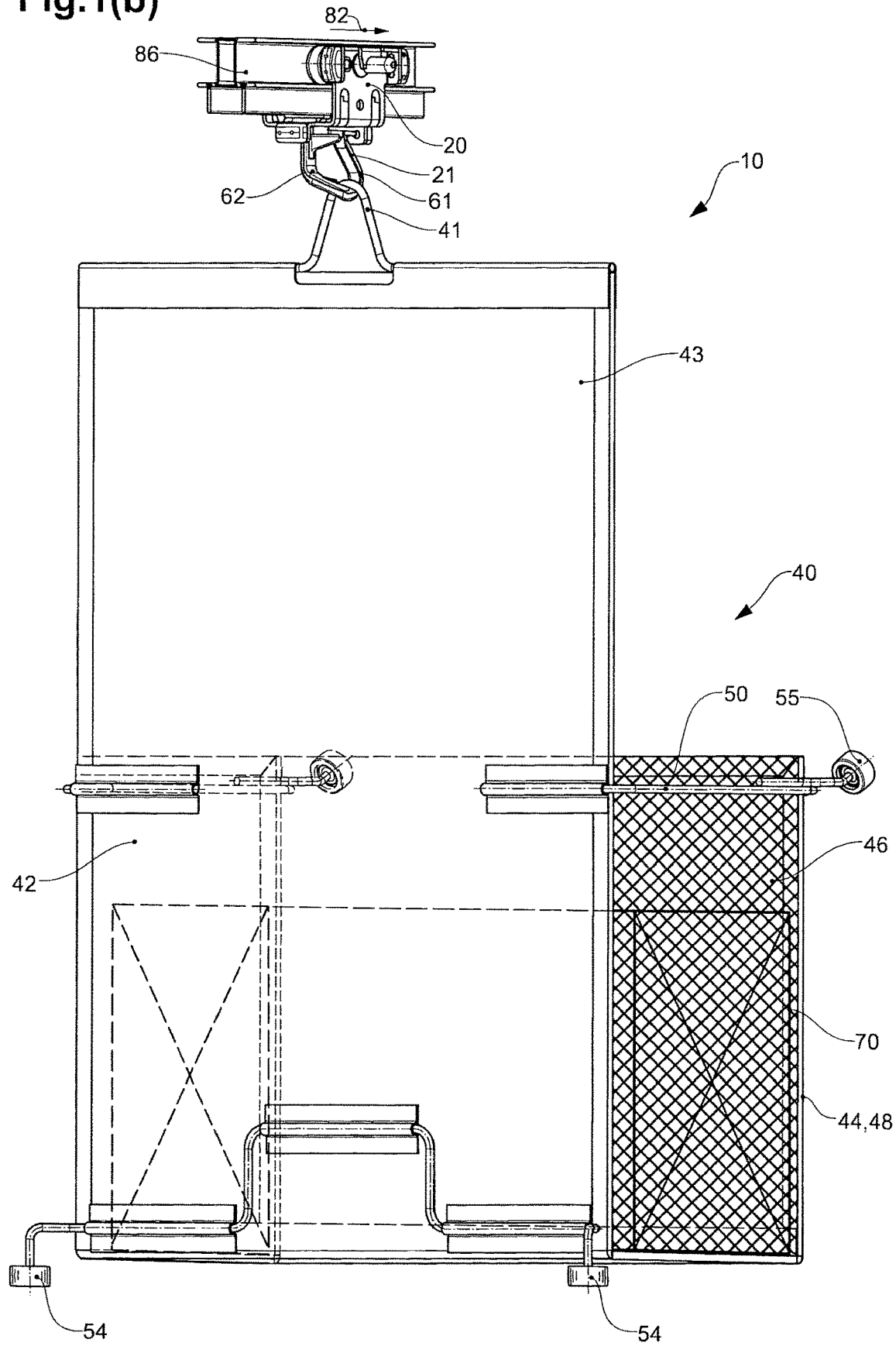
FIG. 1B schematically shows another embodiment of a transport element in the form of a transport bag that may be used in a conveying unit according to the invention, (a) in a perspective view in the open configuration, and (b) in a rear view looking in the conveying direction in the closed, folded-up configuration.
Figure 1C:
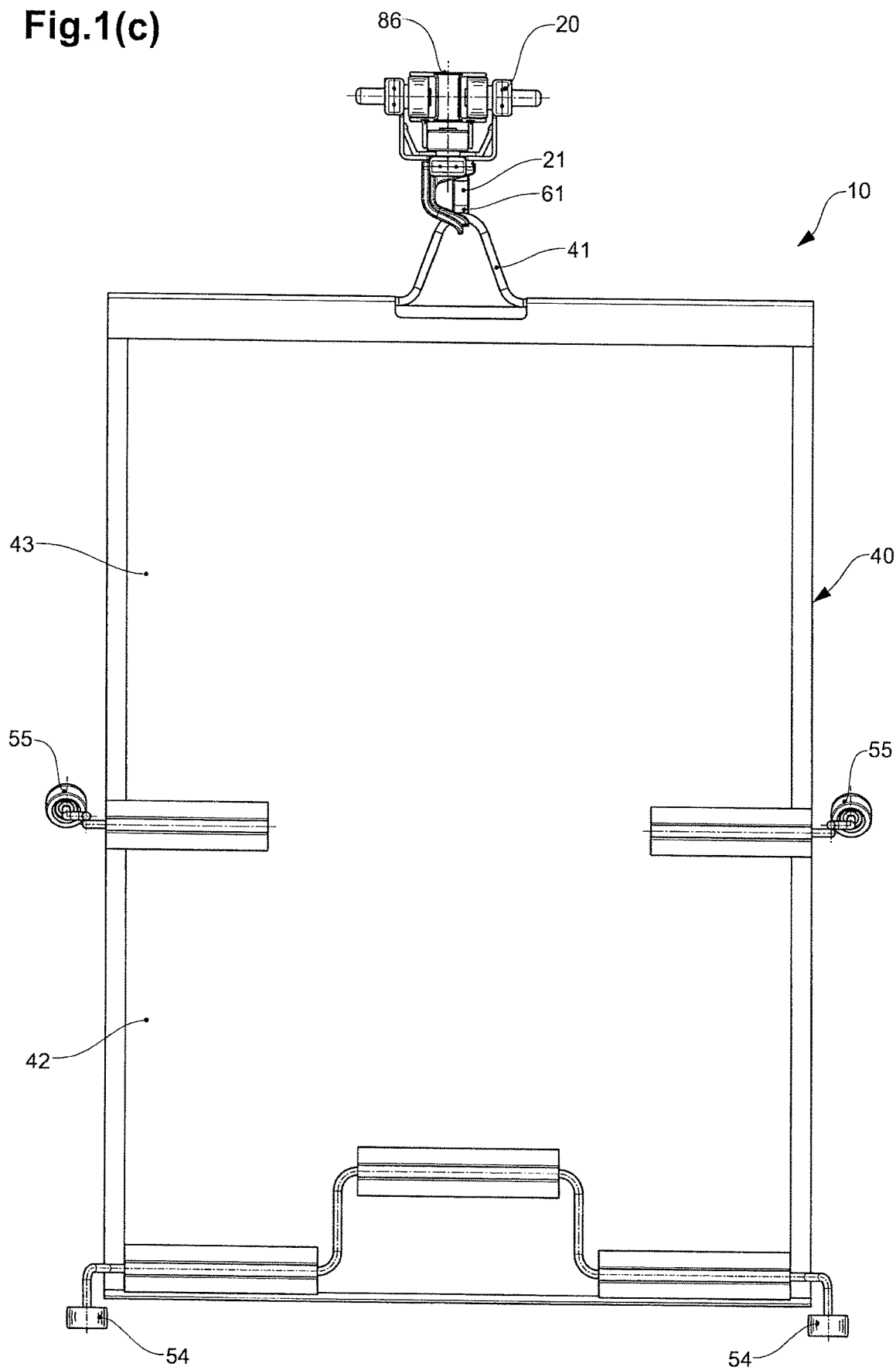
FIG. 1 schematically shows a first possible embodiment of a conveying unit according to the invention, in a first stable position with the suspension hook essentially transverse to the conveying direction, (a) in a side view with the conveying direction toward the right and a detail in the area of the coupling of the two hooks; (b) in an oblique view from the rear; (c) in a rear view looking in the conveying direction, and (d), (e), (f) in various perspective views of the support hook.
FIG. 1A schematically shows the conveying unit from FIG. 1, with an alternative embodiment of a transport element as a transport bag with additional means for transporting garments on clothes hangers, in a first stable position with the suspension hook essentially transverse to the conveying direction, in a side view with the conveying direction toward the right.
Figure 1D:
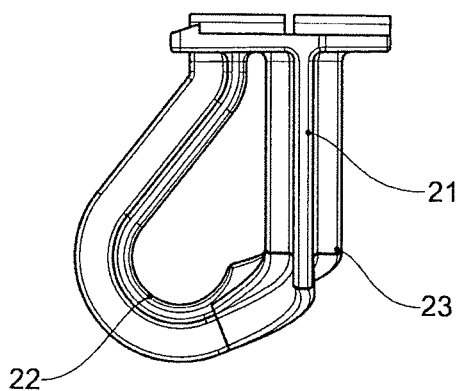
Figure 1E:
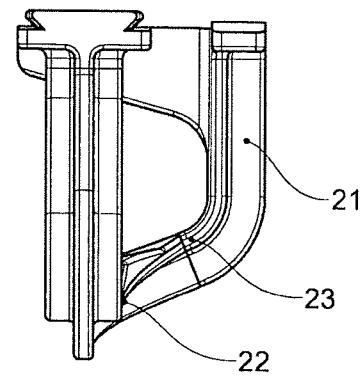
Figure 1F:
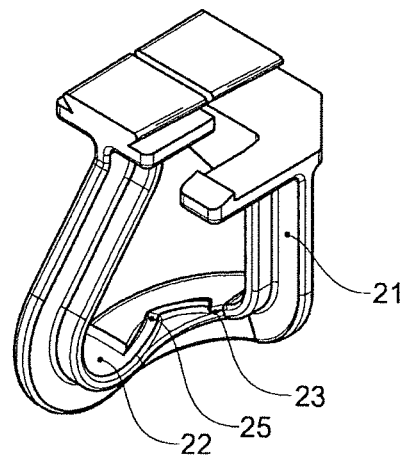

One first possible embodiment of a conveying unit 10 according to the invention is illustrated in FIG. 1. A transport element 40 in the form of a transport bag has a suspension hook 41 that is suspended in a support hook 21 of a conveying element 20. In the example shown, the conveying element is a trolley or carriage of a gravity-driven suspension conveyor facility, analogous to the facility as disclosed, for example, in WO 2016/030275 A1 by the present applicant. For better understanding, the carriage 20 is illustrated on a rail 86 of a conveying system, where it moves in an intended conveying direction 82.

The transport bag includes a front wall 44, a base section 45, and a rear wall 42 that are pivotably connected at the abutting edges. The front wall, rear wall, and base section have a stable design, and may be made, for example, of a suitable plastic material such as a hollow chamber panel. Flexibly designed side walls 46 connect the front wall, rear wall, and base section, resulting in a pocket 47 with an opening into which at least one piece good unit 70 may be loaded. In the example shown, the side walls are made of a fine-mesh net. It is also possible to use a flexible textile material. The side walls 46 are designed in such a way that when the transport bag is folded up, they are likewise folded up, as described below.

A pivotably fastened spacer 50 in the form of a wire bracket is situated on each side, between the front wall 44 and the rear wall 42. The spacers 50 are situated essentially parallel to the base section 45 and have the same length as the base section, and the front wall 44 is situated essentially parallel to the rear wall 42, so that the rear wall 42, spacer 50, front wall 44, and base section 45 form a parallelogram. In the unloaded state, the weight of the front wall and the base section may drop the front wall downwardly, so that the transport bag goes into a second state in which the front wall and the rear wall are close to one another. In this configuration the transport bag may be kept in a conveying system in a space-saving manner by lining up the conveying units flush on a rail, one behind the other.

The transport bag may be transferred from the second, folded-up state into a first, unfolded state by raising the front wall 44 and/or the base section 45 with respect to the rear wall 42, as shown in FIG. 1. The upwardly directed opening in the pocket 47 of the transport bag 40 is now at a maximum size.

In the exemplary embodiment shown, a piece good unit, schematically illustrated by a cuboidal object 70, is situated in the pocket 47 of the transport bag 40.

Two guide rollers 54 are situated at a lower end of the rear wall 42. The guide rollers may be used to additionally move the transport bag 40 during the conveying in a conveying system when the transport bag is being displaced along the conveying direction 82, for example by guiding one or both guide rollers in a connecting link. Similarly, the two guide rollers 55 mounted at an upper end of the front wall 44 may be used to raise the front wall 42.

The rear wall 42 at its upper end is extended into a support section 43, at the upper end of which the suspension hook 41 in the form of a wire bracket is pivotably connected to the rear wall 42 or the support section 43 thereof. The bracket of the suspension hook 41 defines an orientation plane of the suspension hook, and thus, of the entire transport bag.

The support hook 21 is mounted on a lower end of the carriage 20 facing away from the rail 86. The support hook may be made of metal or a suitable polymer material, for example a glass fiber-reinforced thermoplastic material. The support hook 21 has a bracket, which is closed in the installed state, with two bearing segments 22, 23. In the horizontal position of the carriage, the first bearing segment 22 corresponds to the lowest point of the bracket of the support hook. In the illustration in FIG. 1, the suspension hook 41 is in a stable position in which the suspension hook is supported in the first bearing segment 22, where the potential energy is at a minimum. In this stable position, the suspension hook 41 is oriented in a plane transverse to the conveying direction 82, and a front side 48 of the pocket of the transport bag faces in the conveying direction 82.

In the present context, the term "transverse" is understood to mean any orientation of the suspension hook plane in which the suspension hook is not in a plane essentially parallel to the conveying direction 82. In the example shown, the suspension hook, the same as the rear wall 42, is situated in a plane perpendicular to the conveying direction 82. However, other angles would also be possible for which transport bags in the empty or filled state may be supported lined up on the rail in a space-saving manner, one behind the other.

A second bearing segment 23, slightly elevated with respect to the first bearing segment 22, is present on the support hook 21, and is delimited by a small projection 25 on the bracket of the support hook. This second bearing segment 23 likewise corresponds to a local minimum of the potential energy of the suspension hook 41 that is suspended in the support hook. The suspension hook is stable in this second position. The suspension hook must be lifted over the projection 25 in order to go from the first stable position into the second stable position, and vice versa.

In the second stable position, the suspension hook is oriented in a plane essentially parallel to the conveying direction. The term "essentially parallel" is understood to mean that with a corresponding orientation of the suspension hook, and thus also of the rear wall of the transport bag, the opening of the pocket is easily accessible for filling from the side, i.e., transverse to the conveying direction. In the exemplary embodiment shown, the second stable position corresponds to an orientation of the suspension hook plane parallel to the conveying direction 82. However, an orientation, for example, at an angle of 30° to 45° with respect to the conveying direction 82 would also be possible. Loading of a transport bag from the side is likewise possible in such a position, although smaller angles of 30° or less are more advantageous for automated loading processes, since the minimum required distance between the opening of the transport bag and a feed device decreases. For an angle of 0°, i.e., for an orientation of the suspension hook in a plane parallel to the conveying direction, this distance is minimal.

Figure 1A:
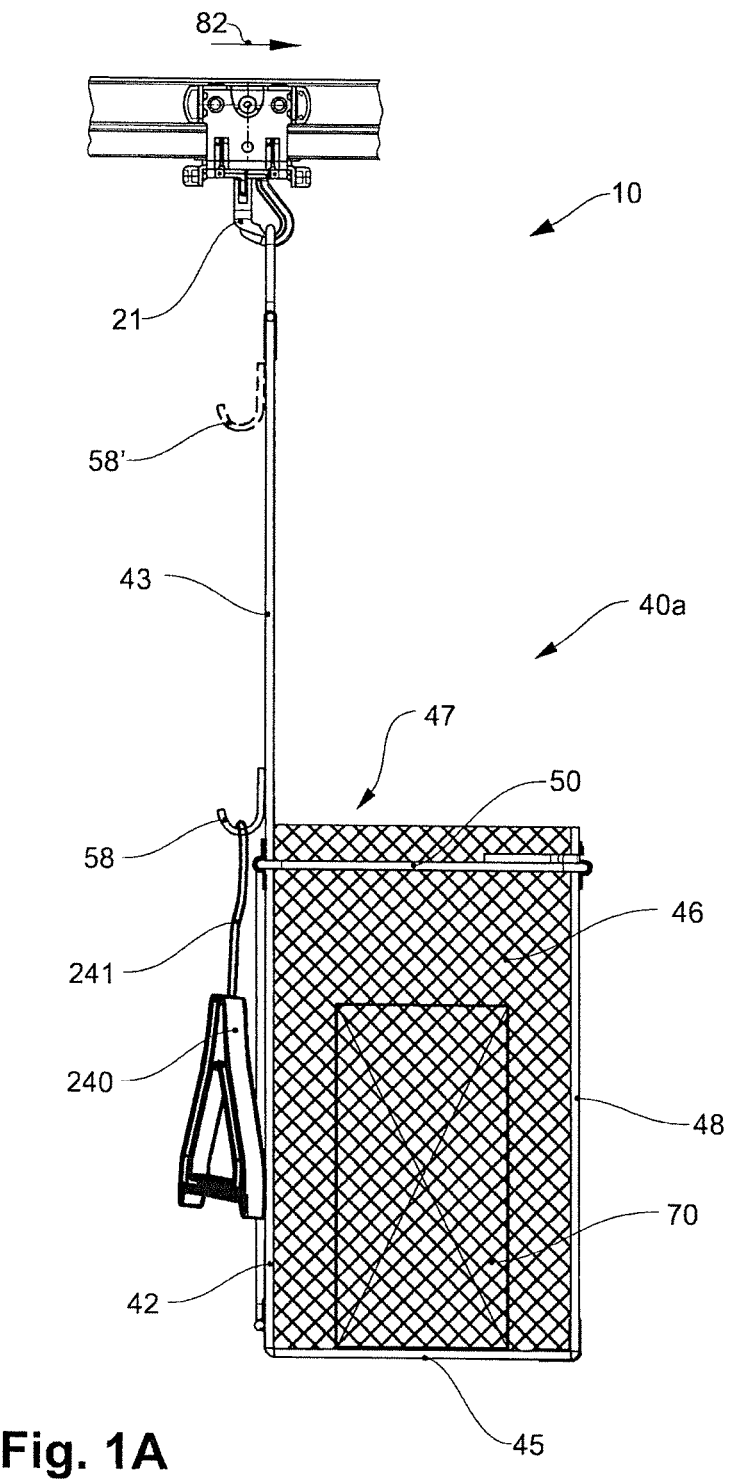
Figure 1B:
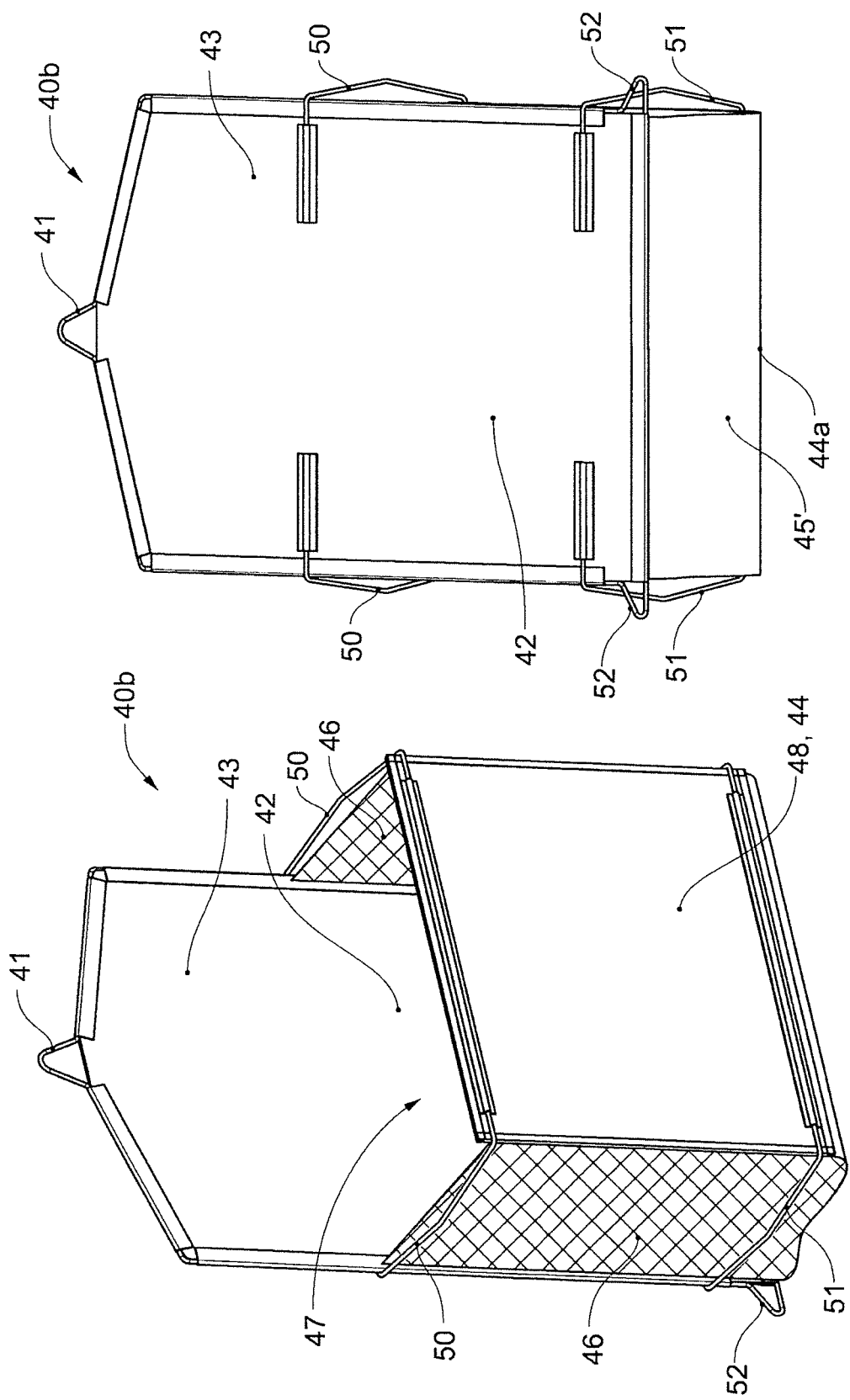

A conveying unit 10 according to the invention with an alternative embodiment of a transport element 40*a* is shown in FIG. 1A. The transport element 40*a* essentially corresponds to the transport bag from FIG. 1, but without guide rollers. A second hook 58 on which a further transport element may be suspended is centrally situated on the rear side of the transport bag 40*a*, at the lower end of the support section 43. In the exemplary embodiment shown, by way of example a clothes hanger 240 is hung with the hook 241 on the second hook 58 of the transport bag 40*a*.

Such a transport bag has the advantage that it is possible to transport and/or store not only piece goods 70 with the transport bag, but additionally or alternatively also garments on clothes hangers. Accordingly, only one transport system is necessary for piece goods, which may be introduced into the pocket 47, as well as for goods that typically must be supported in a suspended manner, for example garments on clothes hangers.

The second hook may be mounted on a lower end of the support section, as in the example shown, or further up. For example, a hook 58' may be mounted at the upper end of the support section, as illustrated in dashed lines in FIG. 1A. Two or more hooks may also be mounted.

Another advantageous embodiment of a transport element 40*b* in the form of a transport bag, as usable in a conveying unit according to the invention, is schematically illustrated in FIG. 1B. This transport element may be combined with a carriage and a support hook, as discussed elsewhere in the present description, to form a conveying element according to the invention.

The transport bag transport element 40*b* includes a front wall 44, a base section 45', and a rear wall 42. The front wall 44 at its lower end is joined to the rear wall by lower spacer elements 51, and at its upper end, by upper spacer elements 50, wherein the spacer elements in the front wall and the rear wall are pivotably supported. The spacer elements 50, 51 in the exemplary embodiment shown are implemented as wire brackets.

The front wall 48 and the rear wall 42 have a stable design, and may be made, for example, of a suitable plastic material such as a hollow chamber panel that is both stable and lightweight. Unlike the exemplary embodiment in FIG. 1, the base section is made of a flexible material such as a tear-resistant plastic film. The mechanically stable connection at the lower end of the front wall and the rear wall is achieved by the lower spacer elements 51.

The spacer elements 50, 51 are situated essentially in parallel to one another and have approximately the same length, and the front wall 44 is essentially parallel to the rear wall 42, so that in each case an edge of the rear wall 42, an edge of the abutting spacers 50, the corresponding edge of the front wall 44, and the edge of the spacer 51 form a parallelogram. In the unloaded state, the weight of the front wall and the base section may drop the front wall downwardly, so that the transport bag goes into a second state in which the front wall and the rear wall are close to one another. The advantages of this configuration have been discussed above.

Flexibly designed side walls 46 connect the front wall 44, rear wall 42, base section 45', and the upper spacer element 50 of the corresponding side, resulting in a pocket 47 with an opening into which at least one piece good unit 70 may be loaded. In the example shown, the side walls are made of a fine-mesh net. It is also possible to use a flexible textile material. The side walls 46 are designed in such a way that when the transport bag is folded up, they may likewise be folded up.

To increase the mechanical stability, in the exemplary embodiment shown the spacer elements 50, 51 are slightly bent toward the outside. As a result, the flexible side walls preferentially move to the outside when the pocket is opened, which is advantageous for the introduction of piece goods.

The transport bag may be transferred from the second, folded-up state, as shown in FIG. 1B(*b*), into a first, unfolded state, as shown in FIG. 1B(*a*), by raising the front wall 44 with respect to the rear wall 42. The upwardly directed opening in the pocket 47 of the transport bag 40 is now at a maximum size.

Stop brackets 52 that extend outwardly in the lateral direction are provided at the lower end of the rear wall 42 on both sides. These stops 52 ensure that when the front wall 44 is raised with respect to the rear wall 42 to open the pocket 47, the lower spacer elements 51 swivel into the horizontal toward the front wall, as intended. On the one hand, the stop brackets 52 prevent the spacer elements 51 from swiveling in the opposite direction. On the other hand, the stop brackets are situated closer to the front wall than the swivel axis of the spacer elements 51 on the rear wall, so that in the second, folded-up state of the pocket the spacer elements 51 do not hang completely vertically, but instead are inclined slightly in the direction of the front wall, so that a force acting from below on the lower edge of the front wall reliably results in opening of the pocket.

The rear wall 42 at its upper end is extended into a support section 43, at the upper end of which the suspension hook 41 in the form of a wire bracket is pivotably connected to the rear wall 42 or the support section 43 thereof. The bracket of the suspension hook 41 defines an orientation plane of the suspension hook, and thus, of the entire transport bag.

The wire bracket of the suspension hook 41 is part of a stable wire rod assembly that extends, starting from the wire bracket 41, on both sides along the upper edge of the support section 43, the lateral edges of the support section 43, and the adjoining lateral edges of the rear wall 42 and to the lower end of the rear wall. At that location the wire rod assembly forms the stop brackets 51, and extends further over a portion of the lower edge of the rear wall. The wire rod assembly is connected to the structure of the rear wall and of the support section along the edges, thus increasing their mechanical stability.

Figure 2A:
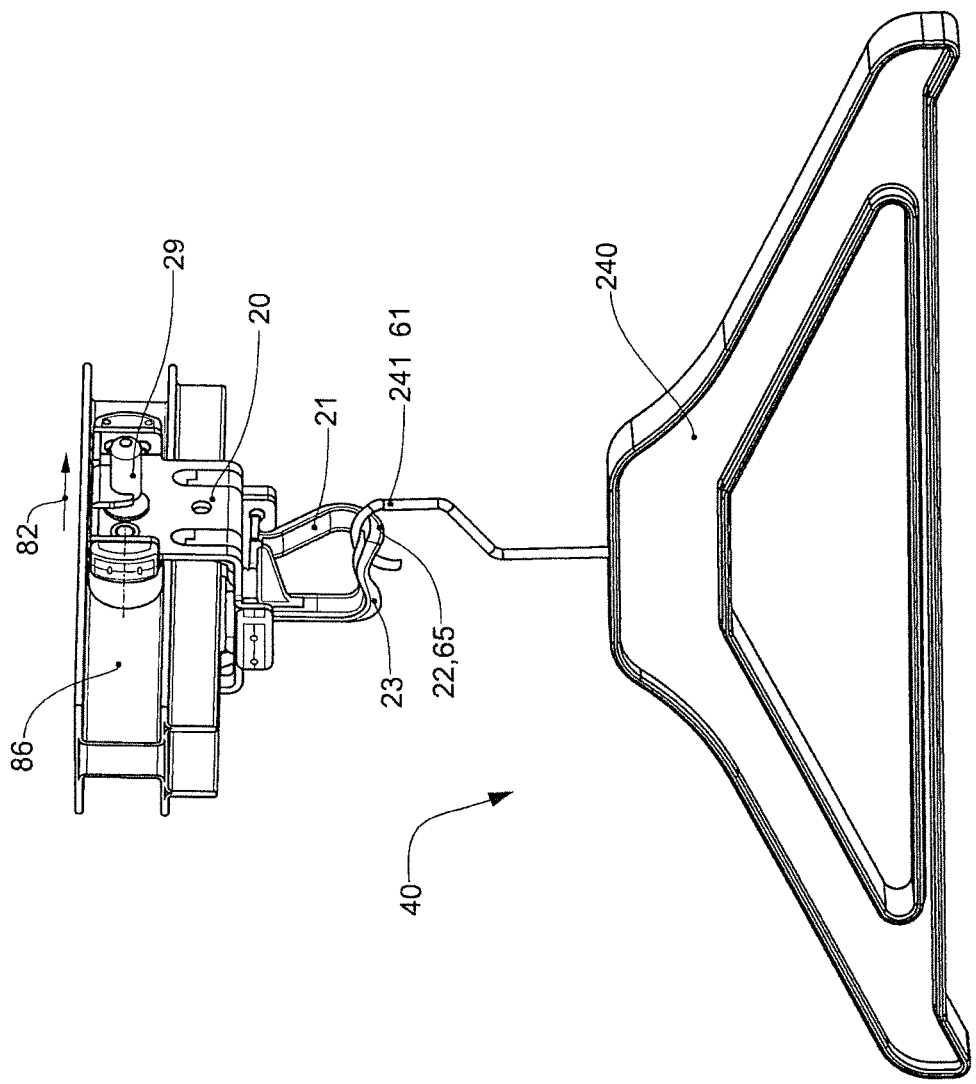
FIG. 2A schematically shows the embodiment of a conveying unit according to the invention from FIG. 2, with a clothes hanger element supported in the support hook, (a) with the suspension hook in a first stable position essentially transverse to the conveying direction; and (b) with the suspension hook in a second stable position with the suspension hook essentially parallel to the conveying direction.
Figure 2A:
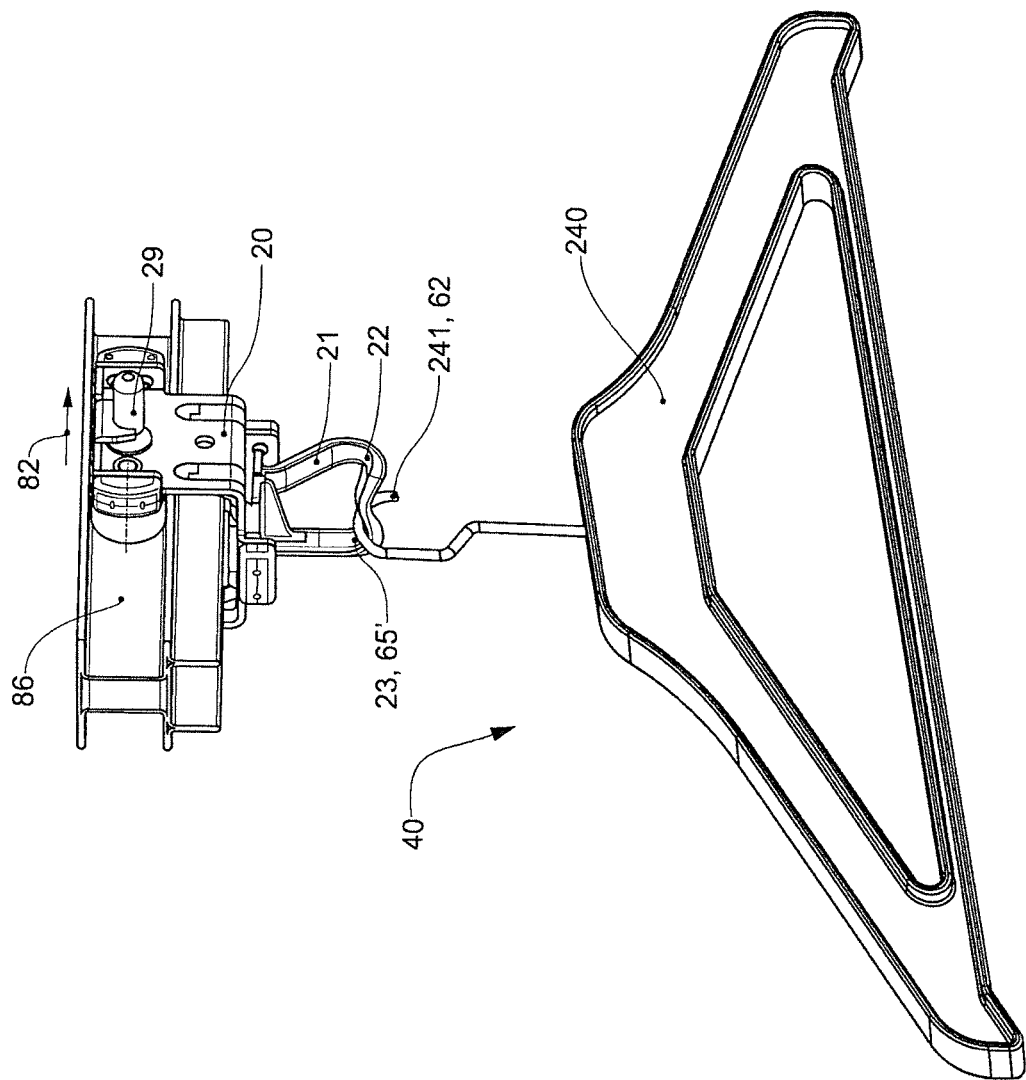

A second possible embodiment of a conveying unit 10 according to the invention is illustrated in FIG. 2. The carriage conveying element 20 and the transport bag 40 with the suspension hook 41 correspond to the exemplary embodiment in FIG. 1, and in this regard have already been discussed. The support hook 21 has two bearing segments 22, 23 which correspond to a local minimum 65, 65', respectively, of the potential energy of a suspension hook 41 that is supported in the support hook 21 in a suspended manner.

In FIG. 2(*a*) the suspension hook 41 is situated on the first bearing segment 22, and assumes a first stable position at the corresponding local minimum 65 of the potential energy. The suspension hook 41, and thus the rear wall of the transport bag 40, occupies a plane transverse to the running direction 82 of the carriage 20. In contrast, in FIG. 2(*b*) the suspension hook 41 is situated on the second bearing segment 23, and at this local minimum 65' of the potential energy occupies a second stable position in which it is oriented in a plane essentially parallel to the running direction 82. To go back and forth between the first stable position and the second stable position, the suspension hook must overcome an elevated area 25 of the bracket of the support hook 21 situated in between.

In the above-mentioned two exemplary embodiments of a conveying unit according to the invention, the suspension hook may be transferred back and forth between the two stable positions by rotating the suspension hook or the transport bag about the longitudinal axis. The suspension hook hereby overcomes the separating area 25 between the two bearing segments 22, 23.

FIG. 2A shows another embodiment of a conveying unit 10 according to the invention. The carriage conveying element 20 and the support hook 21 correspond to the exemplary embodiment in FIG. 2, and in this regard have already been discussed. The transport element 40 is a clothes hanger element in the form of a suspended clothes hanger 240 with a suspension hook 241. A garment is hung on the clothes hanger during operation, but is not illustrated for the sake of clarity.

Analogously to FIG. 2, the suspension hook 241 of the clothes hanger 240 may assume two stable positions 61, 61' in the support hook 21. In a first stable position 61 as shown in FIG. 2A(*a*), the suspension hook 241 is supported on a first bearing segment 22 of the support hook 21. The plane of the clothes hanger element 241 is essentially transverse to the conveying direction 82. In a second stable position 62 as shown in FIG. 2A(b), the suspension hook 241 is supported on a second bearing segment 23 of the support hook 21. The plane of the clothes hanger element 241 is essentially parallel to the conveying direction 82.

An orientation of the bracket plane transverse to the conveying direction allows space-saving conveying and storage of the loaded conveying units. In contrast, an orientation parallel to the conveying direction allows, among other things, a view of the front side and rear side of the transported garment, for example for a visual inspection of a returned garment.

Figure 3:
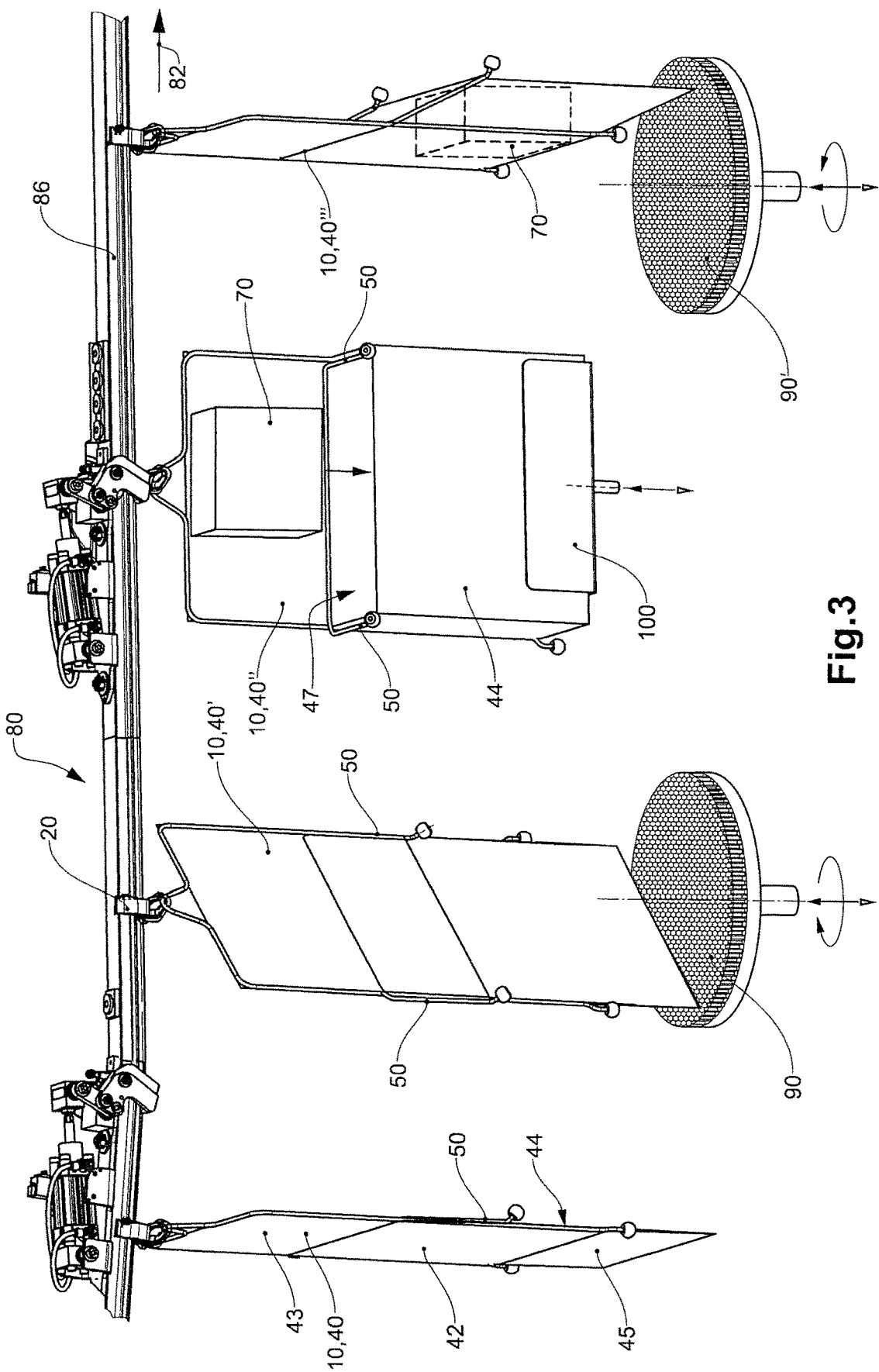

One possible embodiment of a conveying system according to the invention is illustrated in FIG. 3, having an arrangement for loading transport bags. The conveying units 10 essentially correspond to those from FIG. 1, with the carriages 20 schematically illustrated in a simplified manner.

A transport bag 40, driven by gravity, is supplied from the left via a slightly inclined section of the rail 86. The suspension hook is in the first stable position, and together with the rear wall of the transport bag 40 is oriented transversely with respect to the conveying direction 82. The transport bag 40, which is still empty, is in the second, folded-up state in which the front wall 44 and the base section 45 hang vertically on the spacer elements 50, and the pocket has a minimal thickness.

A pocket 40' is now further conveyed to the right, via appropriate external drive means (not illustrated), to a first operative arrangement 90 for actively rotating the transport bag. In the exemplary embodiment shown, the operative arrangement 90 is designed as a brush arrangement, namely, as a brush rotary plate that is vertically raisable and lowerable. When the transport bag, which is still in the first stable position, is above the rotary plate, the rotary plate is lifted and contacts the lowest portion of the pocket, namely, the connecting edge between the front wall and the base section. The brush rotary plate 90 now rotates by 90° in the clockwise direction, thereby entraining the transport bag 40', which correspondingly rotates about the axis of the support hook. The suspension hook goes from the first stable position into the second stable position in which the suspension hook is parallel to the conveying direction 82. The brush rotary plate 90 once again lowers, and the transport bag 40' remains in the second stable position.

The rotation by the operative arrangement does not necessarily have to take place over the entire rotational angle. It is sufficient for the suspension hook to be rotated until it overcomes the elevation of the bracket of the support hook between the two bearing segments. The suspension hook subsequently goes automatically into the second stable position and orientation by gravity.

The transport bag 40" is now conveyed further to the right to an opening means 100 for transferring the transport bag into an open state. In the exemplary embodiment shown, the opening means is designed as a lifting table 100 that raises the front wall 44 of the transport bag 40", thus transferring the transport bag into the first state. The opening of the pocket 47 of the transport bag is now open at the top. A piece good unit 70 may now be introduced into the pocket 47 as schematically illustrated in the figure. The introduction of the piece good unit 70 may take place by manual or automated insertion or placement, for example via a chute, a conveyor belt, or a robotic arm.

The lifting table 100 is subsequently lowered once again. Since the pocket 47 is no longer empty, the transport bag cannot return from the first state into the second state, and remains in a filled intermediate state.

The pocket 40''', which is now loaded, is conveyed further to the right, with the suspension hook still in the second stable position. The transport bag 40''' is rotated in the counterclockwise direction, back into the first stable position, via a further operative arrangement 90' in the form of a raisable and lowerable rotary plate. The suspension hook and the transport bag are now once again transverse to the conveying direction 82. The filled transport bag is conveyed further to the right, and is further transported in the conveying system 80 according to its further destination.

Figure 3A:
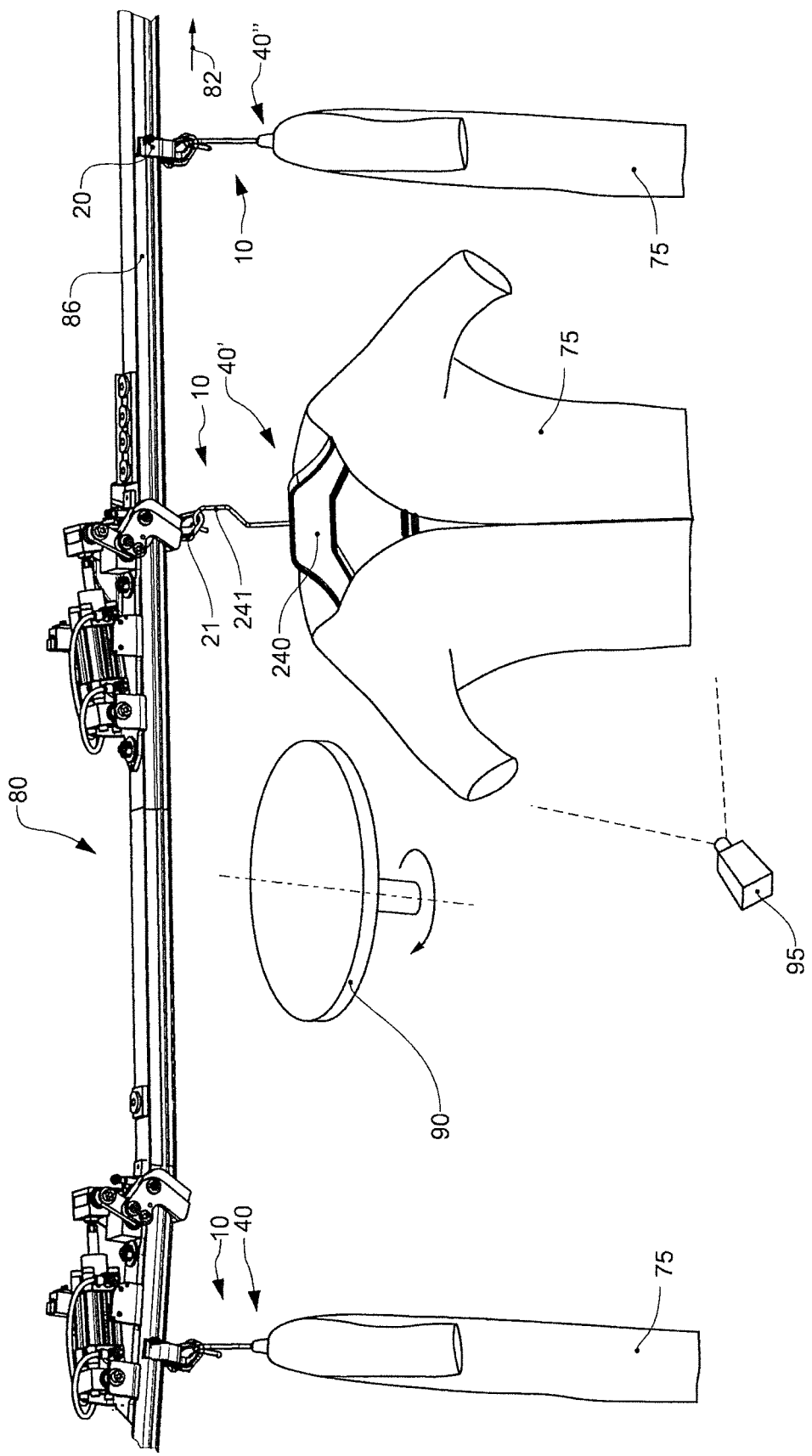
FIG. 3A schematically shows another possible embodiment of a conveying system according to the invention, with conveying units as shown in FIG. 2A.

Another possible embodiment of a conveying system 80 according to the invention is illustrated in FIG. 3A. The conveying units 10, which are only schematically illustrated, include support hooks 41 as already discussed above. Clothes hangers 241, not transport bags, are provided as transport elements.

A clothes hanger transport element 40 loaded with a garment 75, driven by gravity, is supplied from the left via a slightly inclined section of the rail 86. The suspension hook 241 is in the first stable position, and the plane of the clothes hanger 241 is oriented transversely with respect to the conveying direction 82.

A clothes hanger transport element is now conveyed further to the right, via appropriate external drive means (not illustrated), to a first operative arrangement 90 for actively rotating the clothes hanger. The operative arrangement 90, which is illustrated only schematically, may be designed as a brush arrangement, for example, which by a gentle radial application of force brings the clothes hanger transport element 40' into the second stable position in the counterclockwise direction, in relation to the support hook. The suspension hook 241 goes from the first stable position into the second stable position in which the suspension hook and the plane of the clothes hanger are parallel to the conveying direction 82.

The clothes hanger transport element 40' is now conveyed further to the right, where a camera 95 records the front side of the transported garment 75. At the same time, another camera (not illustrated) may record the rear side of the garment. Based on these recordings, for example the type of garment and its state (for mail order returns, for example) may then be checked. Such a visual inspection may also be performed with the human eye instead of by electronic means.

The clothes hanger transport element 40" is conveyed further to the right, with the suspension hook still in the second stable position. The clothes hanger transport element 40" is rotated back into the first stable position, in the clockwise direction, via a further operative arrangement (not illustrated). The suspension hook and the clothes hanger transport element are now once again transverse to the conveying direction 82. The clothes hanger transport element is conveyed further to the right, and is further transported in the conveying system 80 according to its further destination.

Another possible embodiment of a conveying system 80 according to the invention is schematically illustrated in FIG. 4. A plurality of conveying units with still empty transport bags 40' in the folded-up second state are provided in a staggered, space-saving arrangement in a feed area. The pockets may be brought into the staggered arrangement and held therein by appropriate guide means 102, for example. In this staggered arrangement, the suspension hooks and the transport bags are already rotated with respect to the first stable position, transverse to the conveying direction 82. If the front transport bag in the staggered arrangement is now conveyed further to the right, in the exemplary embodiment shown a bracket 103 pushes this pocket further in the clockwise direction about the vertical, so that the suspension hook now automatically goes into the second stable position parallel to the conveying direction 82. The pocket 40" may now be transferred once again into the first state via a suitable opening means 100.

After the transport bag 40''' is loaded, it is transferred once again into the first stable position via suitable means (not illustrated), and continues into the conveying system 80 for further use.

The exemplary embodiment from FIG. 4 has the particular advantage that the cycle time may be reduced. An empty transport bag to be filled only has to be supplied over a short distance, and to a substantial extent is already rotated from the first stable position in the direction of the second stable position. The remaining swiveling of the transport bag into an orientation plane parallel to the conveying direction then takes place essentially automatically.

In another embodiment of a conveying system, not illustrated, the rotation of the supplied empty transport bags takes place via connecting links for the guide rollers 54. While a transport bag is being supplied in the first stable position transverse to the conveying direction 82, one or both of the guide rollers 54 of the pocket slide(s) into a connecting link or guide rail. With a suitable arrangement of the guide rail, upon further conveying of the transport bag along the conveying path the transport bag is rotated about the axis of the support hook and goes into the second stable position. The guide slots are now no longer necessary. After the transport bag is opened and filled, it may analogously be swiveled back from the second stable position into the first stable position.

This variant has the particular advantage that for rotating between the first and the second stable positions, a transport bag does not have to be stopped, which reduces the cycle time.

The various illustrated operative arrangements for rotating the transport bags may also be combined. In addition, those skilled in the art may use other actuating means via which a rotation of the transport bags may be achieved. For example, rotating devices may be provided that push against the pockets and thus cause rotation. Also possible are linear actuators that push against a pocket and are thus able to rotate it.

The opening means may also be designed as a ramp which is arranged in such a way that the base section of an empty pocket is continuously raised by the ramp during the conveying, so that the pocket goes into the first, open state.

Another option is the use of a ramp-shaped conveyor belt which, analogously to the above-mentioned ramp, has the advantage that the transport bag is actively carried along at its lower end, so that opening the pocket may take place in a very controlled manner.

In a further, third possible embodiment of a conveying unit according to the invention as illustrated in FIG. 5, the transition between a first stable position and a second stable position of the suspension hook takes place by rotating the support hook 21 in space.

The conveying element 20 and the transport bag 40 with the suspension hook 41 once again correspond to the exemplary embodiment in FIG. 1, and in this regard have already been discussed. The support hook 21 of the conveying unit 10 is designed in such a way that in two given positions of the support hook 21 in space, in each case a bearing segment corresponds to a minimum of the potential energy of the suspension hook 41 in the support hook 21, i.e., a stable position of the suspension hook.

The first stable position is not illustrated in FIG. 5, and essentially corresponds to the situation in FIG. 2(*a*), in which the carriage 20 is situated horizontally on the rail 86, and the support hook 21 is oriented essentially vertically downwardly. The suspension hook 41 in the first stable position is at the local minimum 65 of the potential energy, on the first bearing segment 22. The suspension hook 41 is oriented in a plane transverse to the conveying direction 82.

In contrast, in the situation illustrated in FIG. 5, the rail 86 and the carriage 20 mounted thereon are rotated about the conveying direction 82 by an angle of approximately 45°. Similarly, the support hook 21 is also rotated from the vertical by an angle of approximately 45°. In this orientation of the support hook 21 in space, it is no longer the first bearing segment 22, but, rather, the second bearing segment 23 that corresponds to a minimum 65' of the potential energy of the suspension hook 41 in the bracket of the support hook 21. The suspension hook 41 is in a second stable position, and is oriented in a plane essentially parallel to the conveying direction 82.

In the exemplary embodiment shown, the transfer of the suspension hook back and forth between the first stable position and the second stable position takes place by rotating the support hook 21 together with the carriage 20. This may be easily achieved by providing a twisted rail 86 over a sufficiently long area. During the conveying of the carriage 20 through a corresponding section of the rail 86, the carriage 20 and thus also the support hook 21 are likewise rotated. At the same time, the suspension hook 41 in the bracket of the support hook 21 is raised to a new, unstable position and slides, driven by gravity, from the first, no longer stable position into the second stable position, or vice versa. The suspension hook 41 correspondingly swivels back and forth between the associated orientation planes.

This embodiment of a conveying unit has the particular advantage that the rotation of the suspension hook may be integrated directly into the conveying process without the need for stopping or decelerating a conveying unit for rotating the suspension hook and the transport bag. Accordingly, short cycle times are possible.

A further advantage is that various types of transport elements, for example transport bags and clothes hangers, may be simultaneously used, so that for the various types of transport elements there is no need for various operative arrangements for rotating the particular transport elements.

Figure 5A:
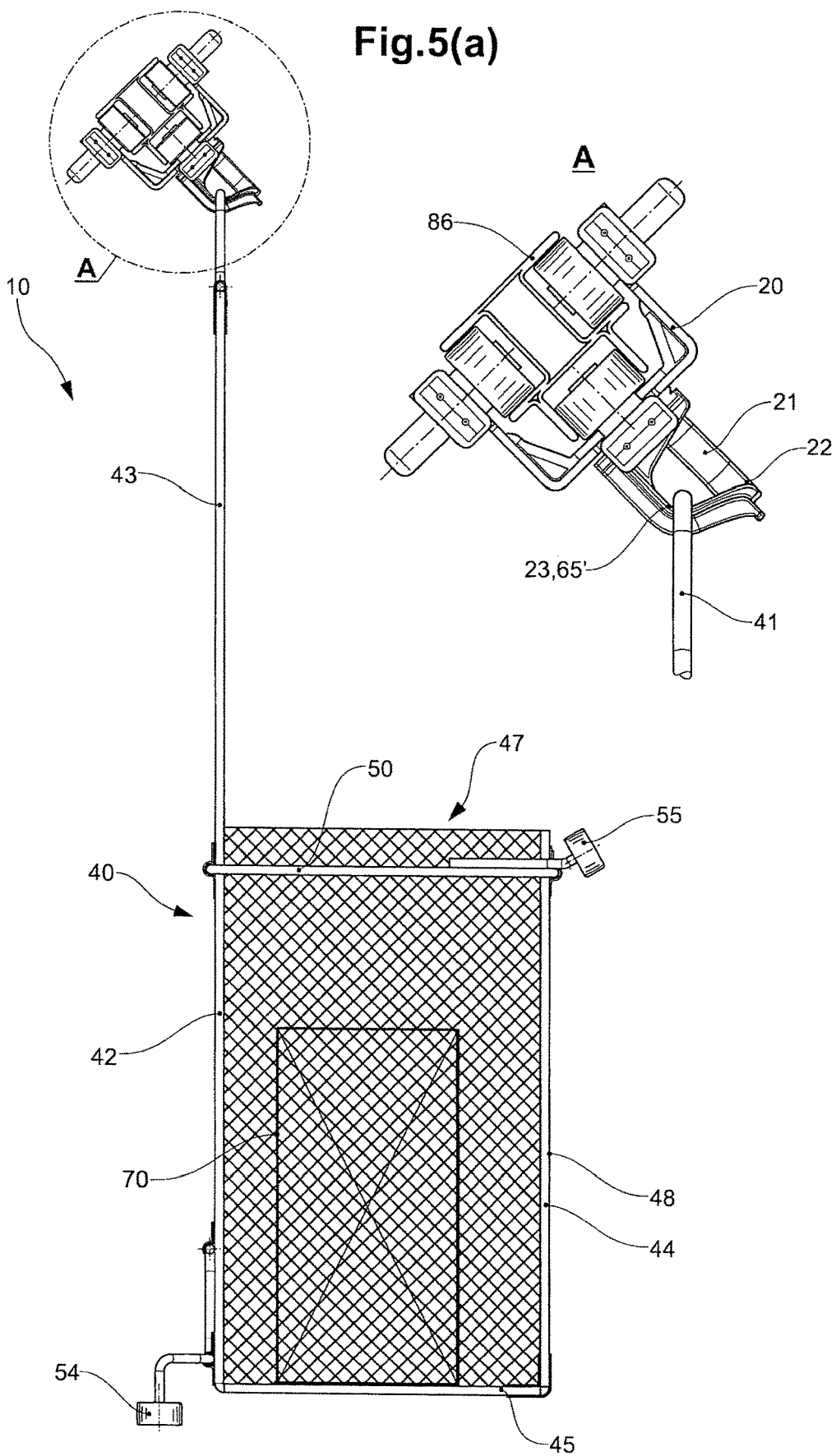
FIG. 5A schematically shows yet another possible embodiment of a conveying unit according to the invention, in a detail view of the suspension hook and the support hook, (a) with the support hook in a first orientation with respect to the vertical and the suspension hook of a transport bag in the only stable position, and (b) with the support hook in a second orientation with respect to the vertical and the suspension hook in a second of two possible stable positions.
Figure 5B:
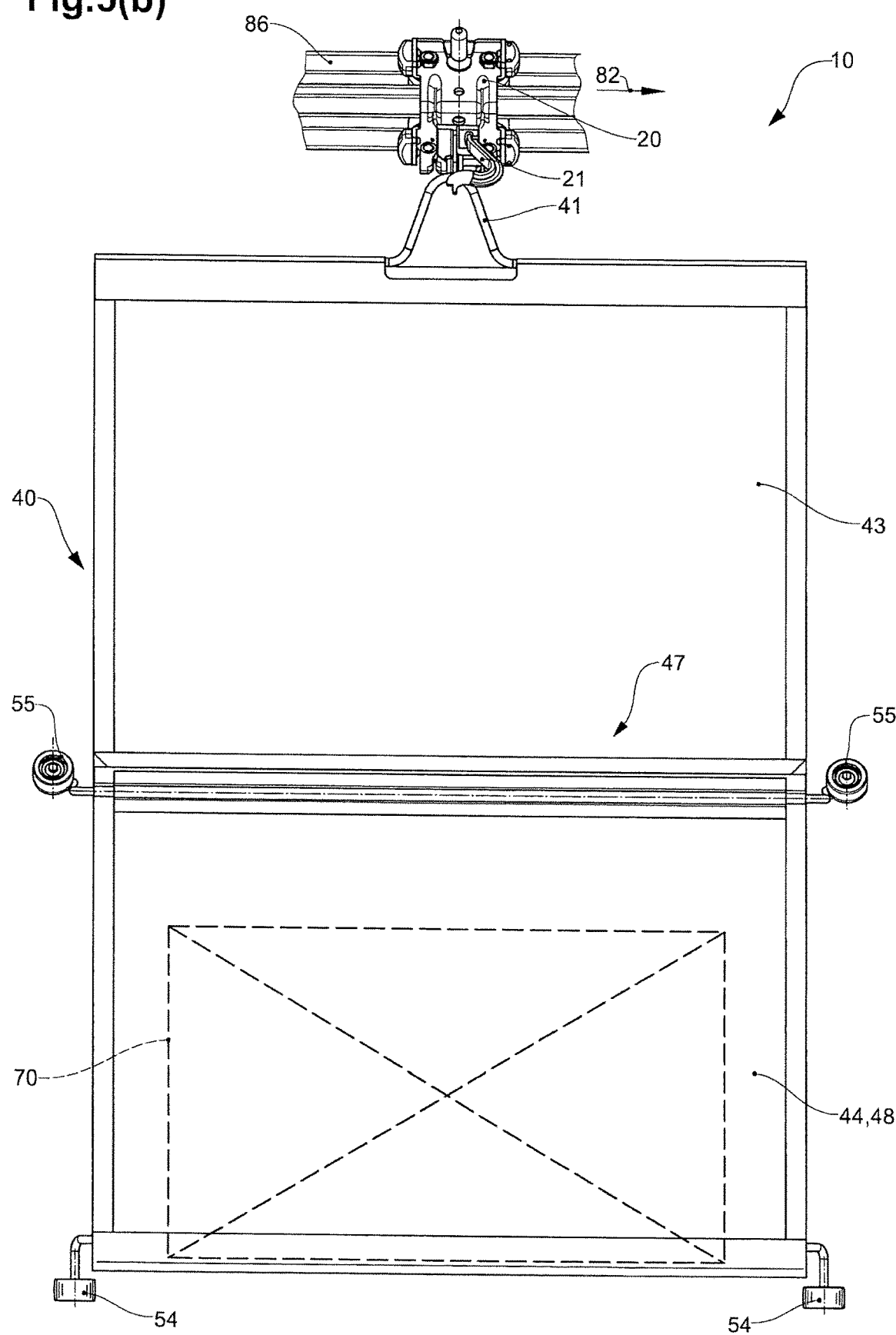
FIG. 5 schematically shows a third possible embodiment of a conveying unit according to the invention, in a second stable position with the suspension hook essentially parallel to the conveying direction, (a) in a side view of the transport element looking in the conveying direction, and a detail A in the area of the coupling of the two hooks; and (b) in a front view.
Figure 5A:
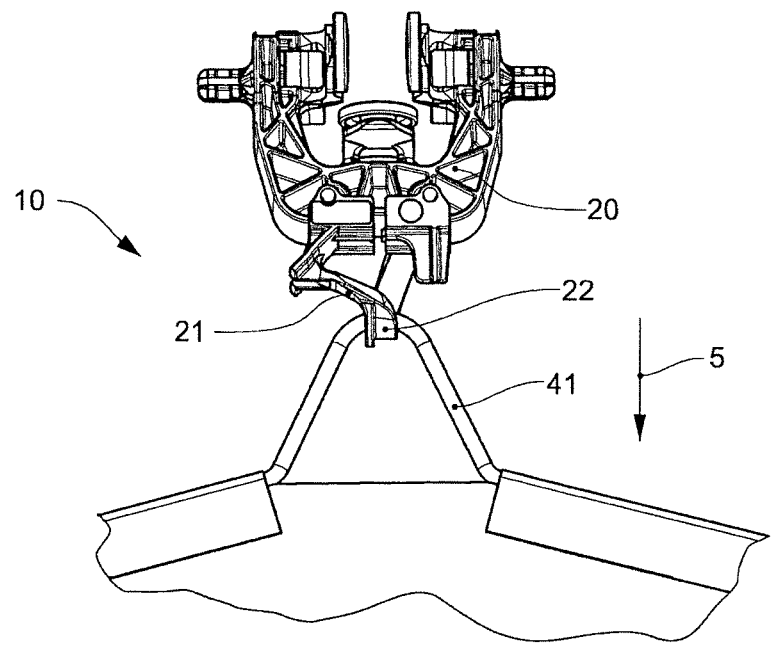
Figure 5A:
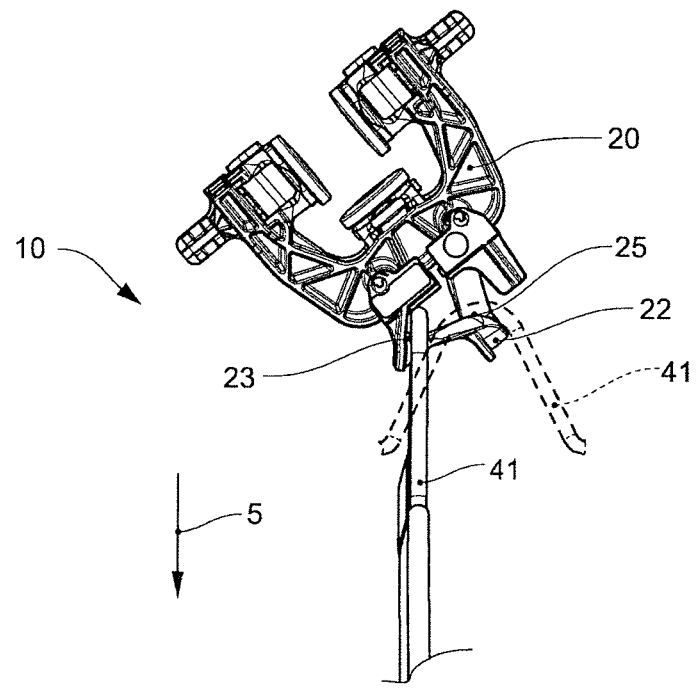

In another advantageous embodiment variant of a conveying unit 10 according to the invention, as shown in FIG. 5A, the support hook 21 is designed in such a way that in a first given position of the support hook 21 in space (see vertical 5), a bearing segment 22 corresponds to a local minimum of the potential energy of the suspension hook 41 in the support hook 21, i.e., a stable position of the suspension hook. This first position is apparent in FIG. 5A(a), and is analogous to the orientation in FIG. 1(*a*), for example. The suspension hook 41 is in the only stable position, with the transport element oriented transversely with respect to the conveying direction.

In a second given position of the support hook 21 in space, as shown in FIG. 5A(b), corresponding to a rotation by 45° with respect to the vertical 5, the support hook has two bearing segments 22, 23 which correspond to a local minimum of the potential energy of the suspension hook in the support hook, i.e., two possible stable positions of the suspension hook. The first bearing segment 22 corresponds to the single bearing segment 22 in the first given position of the support hook in space, in which the transport element is transverse to the conveying direction. For the second bearing segment 23, the transport element is oriented parallel to the conveying direction.

If the support hook, starting from the orientation shown in FIG. 5A(a), is rotated by 45°, upon rotation of the support hook from the first into the second orientation, the suspension hook 41 in the support hook 21 for the time being remains in the same stable position on the bearing segment 22 (illustrated in dashed lines). However, by rotating the transport element, for example via a tangential force acting on the transport element, the suspension hook 41 in the support hook 21 may now be brought from this first stable position 22 into the second stable position 23, as shown in FIG. 5A(b), and also back into the first stable position 22, in each case by overcoming a local maximum 25 of the potential energy.

If the support hook 21 is rotated back into the first given position, the suspension hook 41, driven by gravity, slides from the second position 23 in the support hook, which is no longer stable, directly back into what is now the only stable position 22, as illustrated in FIG. 5A(a). If the suspension hook 41 is already in the first stable position 23 in the support hook, it naturally remains there.

Such a conveying unit has the advantage that in a first orientation of the support hook, which corresponds to the standard orientation of the rail, only one defined orientation of the transport element is possible. In order to activate the option for reversibly switching between two orientations of the transport element, the rail, rotated by 45°, is situated in a corresponding partial area of the conveying path.

The illustrated embodiment variant may of course also be implemented using clothes hanger transport elements. The rotation of the suspension hook and of the clothes hanger without interrupting the conveying processes is particularly advantageous for an automatic visual inspection with a high clock rate, for example for quality control within a manufacturing process.

Figure 6B:
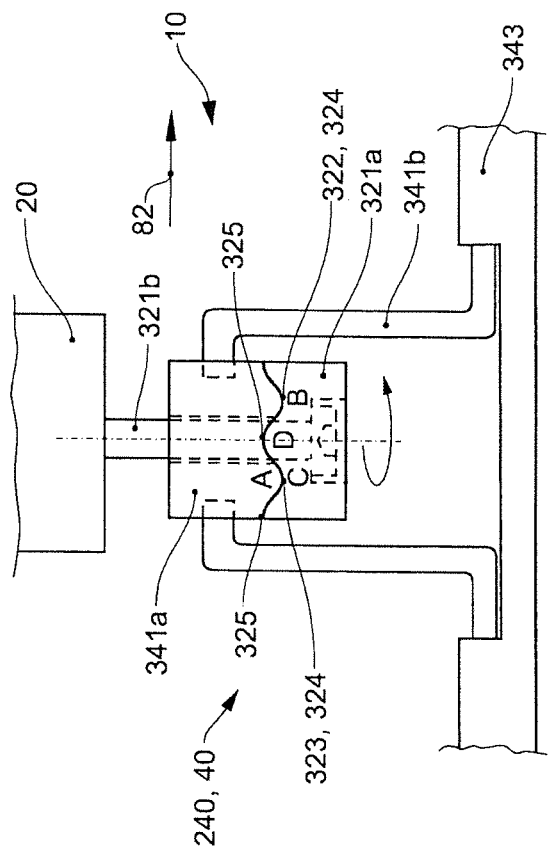
FIG. 6 schematically shows a fourth possible embodiment of a conveying unit according to the invention in a detail view of the suspension hook supported in the support hook, (a) with the suspension hook in a first stable position in which the support section of the transport bag extends essentially transversely with respect to the conveying direction; (b) with the suspension hook in a second stable position in which the support section of the transport bag extends essentially in parallel to the conveying direction; and (c) in a top view of the support surface of the support hook.
Figure 6A:
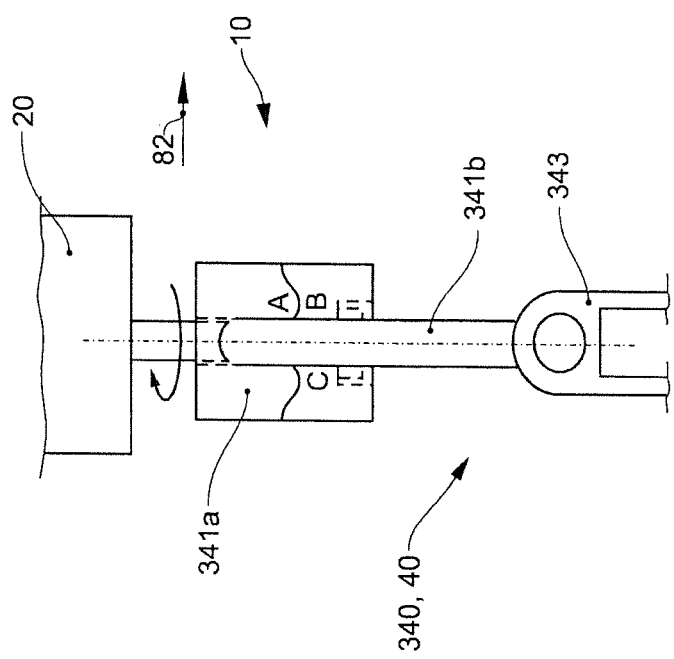
Figure 6C:
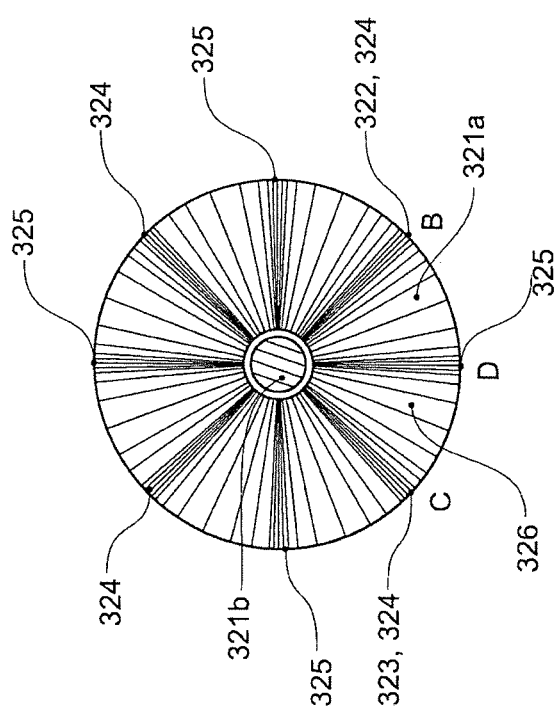

A fourth possible embodiment of a conveying unit 10 according to the invention, with a transport bag 340 as transport element 40, is shown in a detailed view in FIG. 6. The carriage 20 is only schematically illustrated. The suspension hook 341a, 341b and the upper end of the support section 343 are the only portions of the transport bag 340 that are visible. Otherwise, the transport bag 340 corresponds to the transport bags from FIGS. 1 and 1A.

The support hook is made up of a first support hook element 321a and a second support hook element in the form of a pin 321b that nonrotatably connects the first support hook element 321a to the carriage 20. The first support hook element 321 is made up of a cylinder that is aligned with the pin 321b. The end face of the cylinder facing the carriage 20 is advantageously designed as an undulated support surface 326. This support surface has radially symmetrical depressions 324 and elevations 325 that are uniformly spaced in the radial direction. In the exemplary embodiment shown, the angle between two depressions is 90°.

The suspension hook of the transport bag is made up of two elements 341a, 341b. A lower bracket-shaped, second element 341b is connected to the support section 343 of the transport bag. At the upper end the bracket-shaped, second support hook element 341b is connected to a first support hook element 341a. The bracket 341b may be connected to the first support hook element 341a so that it is pivotable about a horizontal axis, or is nonrotatable, depending on the intended application. The first support hook element 341a has a design that is analogous to the first support hook element 321a, having an undulated support surface, facing the support section with four depressions and four elevations, and resting flush on the undulated support surface of the first support hook element 341a. A continuous borehole through which the pin 321b extends is situated in the center of the first support hook element 341a.

In the first stable position shown in FIG. 6(a), the support section of the transport bag is oriented essentially transversely with respect to the conveying direction. An elevation, denoted by reference character "A," on the support surface of the first suspension hook element 341a rests in a depression, denoted by reference character "B," in the support surface of the first support hook element 321a. If the transport bag 340 is now rotated along the axis by the pin 321b, the elevation "A" of the support surface of the first suspension hook element 341a slides upwardly on the support surface of the first support hook element 321a, overcomes the elevation, denoted by reference character "D," of the support surface of the first support hook element 321a, and slides back downwardly into a stable position, as shown in FIG. 6(b). The elevation "A" of the support surface of the first suspension hook element 341a now rests in the depression, denoted by reference character "C," in the support surface of the first support hook element 321a. The suspension hook is now in a second stable position in which the support section 343 of the transport bag extends essentially parallel to the conveying direction 82.

The angle between the first stable position and the second stable position of the suspension hook 341a on the support hook 321a is specified by the angle between two adjoining elevations 325. In the exemplary embodiment shown, the angle is accordingly 90°. However, other angles are also achievable, for example 30°, 45°, or 120°, as long as an integer multiple thereof results in 360°.

Such a conveying unit is particularly advantageous due to the fact that it allows not only rotation back and forth between two stable positions, but also further rotation of the suspension hook in both directions, in each case in the predefined discrete angular increments.

The first support hook element 321a and the first suspension hook element 341a may be cost-effectively manufactured by injection molding, using a suitable plastic material such as HDPE.

Figure 7:
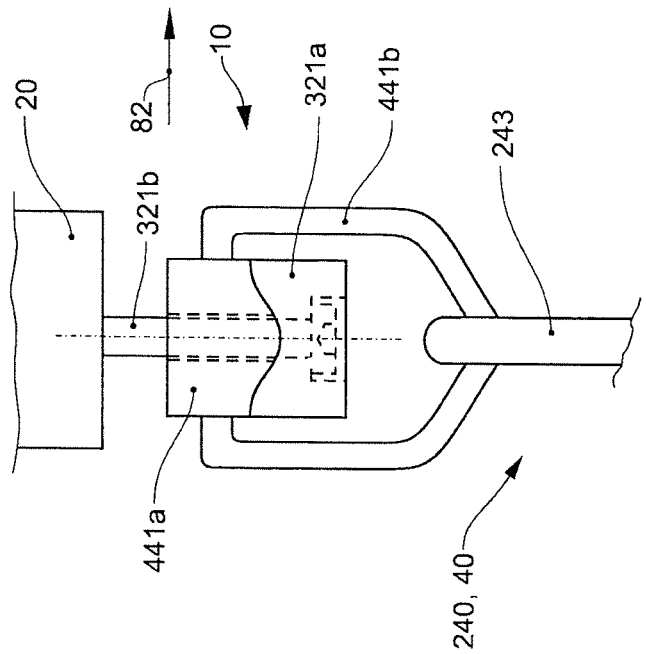
FIG. 7 schematically shows a fifth possible embodiment of a conveying unit according to the invention in a detail view, with the suspension hook in a first stable position in which a clothes hanger extends essentially transversely with respect to the conveying direction.

A fifth possible embodiment of a conveying unit 10 according to the invention is illustrated in FIG. 7. The support hook 321a, 321b as well as the first suspension hook element 441a correspond to those from FIG. 6. The second suspension hook element 441b is designed as a closed bracket. A hook 243 of a clothes hanger 240 is once again hung in this bracket.

Figure 8:
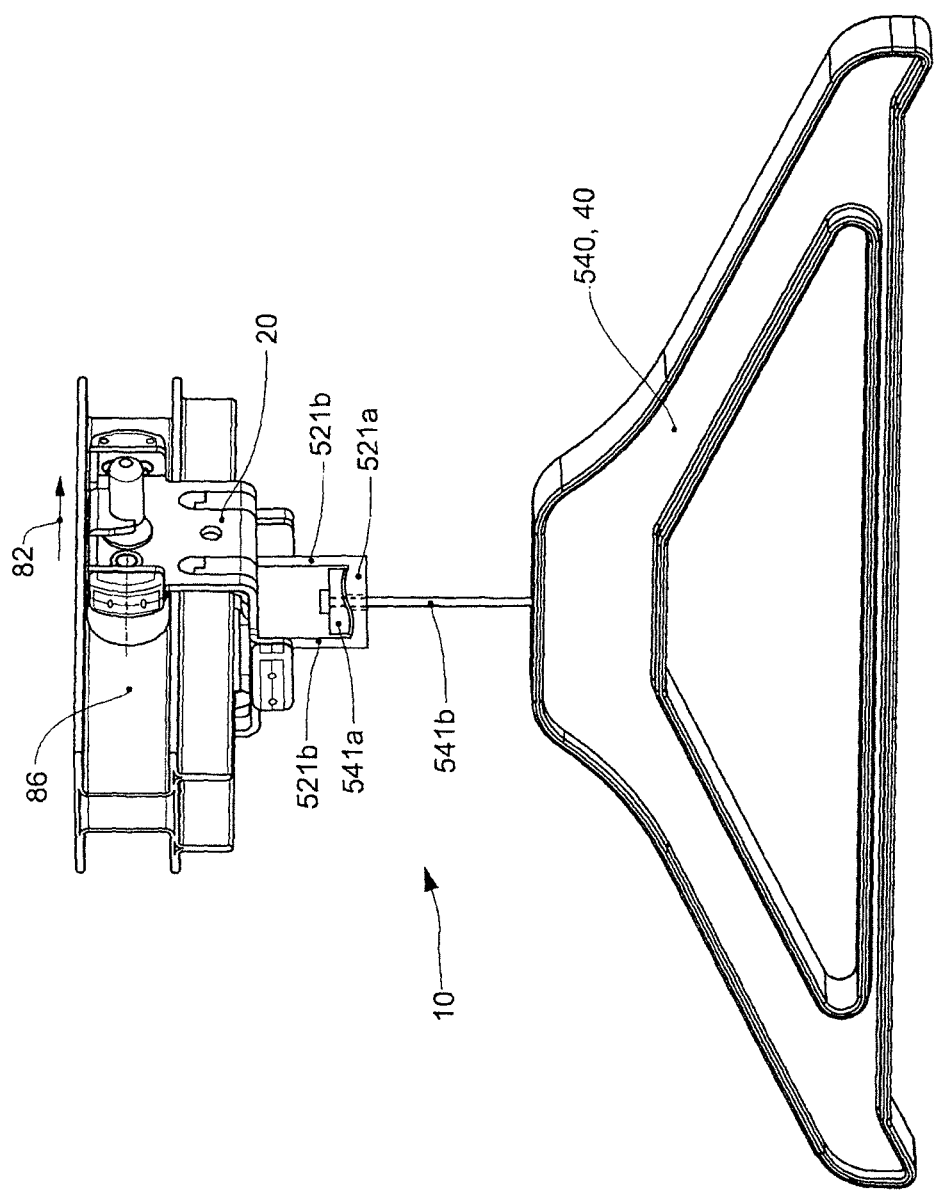
FIG. 8 schematically shows a sixth possible embodiment of a conveying unit according to the invention, with a clothes hanger element supported in the support hook, with the suspension hook in a first stable position in which the clothes hanger is essentially transverse to the conveying direction.

A sixth possible embodiment of a conveying unit 10 according to the invention is shown in FIG. 8. The transport element 40 is designed as a clothes hanger 540. The support hook is made up of two support hook elements 521a, 521b. A first support hook element 521a has an undulated support surface, analogously to the embodiments in FIGS. 6 and 7. The first support hook element is connected to a carriage 20 via two bars of the second support hook element 521b. The suspension hook of the transport element 40 is made up of two suspension hook elements 541a, 541b. A first suspension hook element 541a includes an undulated support surface, analogously to the embodiments in FIGS. 6 and 7. The second suspension hook element in the form of a rod or pin 541b extends through a borehole in the first support hook element 521a, and connects the first suspension hook element 541a to the clothes hanger 540.

Such a variant of a conveying unit according to the invention is particularly advantageous in cases where garments for further processing are temporarily hung on clothes hangers, for example for processing mail order returns, or for checkrooms.

A seventh possible embodiment of a conveying unit 10 according to the invention is illustrated in FIG. 8. In this embodiment variant, the transport element is designed as a holding device 550 for a plurality of containers 76. In the example shown, the holding device 550, only schematically shown, with two parallel holding elements 551 holds five containers 76 in a row in a form-fit and/or force-fit manner. The containers may be released or reversibly fixed by means of a schematically shown actuating element 552. The actuating element may be activated by integrated or external actuator devices, or also manually.

The support hook essentially corresponds to the support hook as shown in FIG. 8. The support hook includes two support hook elements 521a, 521b, of which a first support hook element 521a has an undulated support surface, and is connected to the carriage 20 by two bars of the second support hook element 521b. The suspension hook of the transport element 40 is made up of two suspension hook elements 541a, 541b, of which a first suspension hook element 541a has an undulated support surface. The second suspension hook element in the form of a rod or pin 541b extends through a borehole in the first support hook element 521a, and connects the first suspension hook element 541a to the holding device 550 for containers.

Figure 9:
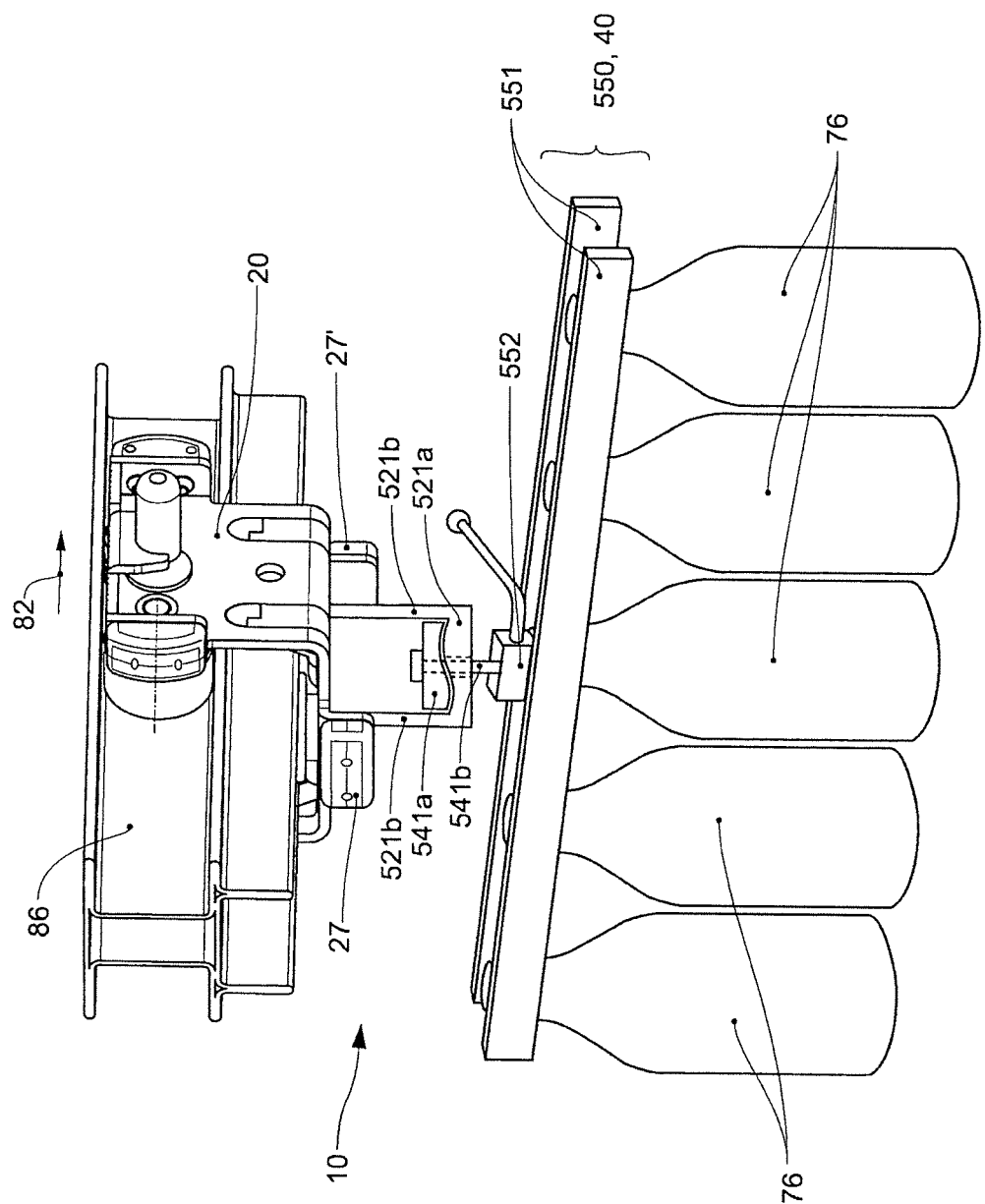
FIG. 9 schematically shows a seventh possible embodiment of a conveying unit according to the invention, with a holding device for multiple containers supported in the support hook, with the suspension hook in a first stable position in which the holding device is essentially transverse to the conveying direction.

In the configuration shown in FIG. 9, the suspension hook is in a first stable position in which the holding device 550 is essentially transverse to the rail 86 and the conveying direction 82. In this configuration, loaded or empty conveying elements 10 may be accumulated, buffered, or stored along the rail 86 with minimal space requirements.

Two shock absorber elements 27, 27', mounted in flush alignment with the rail 86 on both sides of the carriage 20, in this configuration ensure a minimum distance between individual conveying units 10, and are used as shock absorbers between the conveying units. The shock absorber elements may be designed, for example, as blocks made of a suitable elastomer.

In a second configuration not illustrated, the suspension hook is in a second stable position in which the holding device 550 is essentially parallel to the conveying direction 86. In this configuration, the containers of the holding device are thus also in flush alignment with and parallel to the conveying direction 86. In the second configuration it is possible, for example, to release containers 76 that are supplied by a conveying unit 10, so that they may be received by a further conveying means, for example a belt conveyor, for further processing. Alternatively, containers that are supplied by a further conveying means, such as the above-mentioned belt conveyor, may also be received by an empty conveying unit in the second configuration. The conveying unit 10 according to the invention thus offers the advantage that this transfer between conveying units 10 according to the invention may be carried out continuously. For this purpose, the conveying units must be guided on their conveying path at the same speed as the other conveyors during the transfer, in parallel and with a suitable orientation relative to one another. The holding device is advantageously likewise actuated during the conveying.

A visual inspection of the containers is simplified in this position.

FIG. 10 schematically shows the use of conveying units according to the invention, similarly to those from FIG. 9. The conveying units, only schematically shown, have two spacer elements 28, 28' on the carriage 20 in addition to the shock absorber elements 27, 27', which are active in the conveying direction. In the example shown, the stated spacer elements are designed as rods that are situated on the suspension hook in parallel to the holding device.

The spacer elements 28, 28' protrude beyond the holding device to the extent that in the accumulated, staggered arrangement of the conveying units in the second configuration, as illustrated in section A of the conveying path, containers 76 or holding devices 550 of adjacent conveying units cannot make contact. However, the shock absorber elements 27, 27' of the carriages have no function, since they cannot make contact.

In the first configuration of the conveying units in which the holding devices are oriented transversely with respect to the rail, as shown in section C of FIG. 10, once again the spacer elements 28, 28' have no function. The shock absorber elements 27, 27' are used here as spacer elements, which are arranged in such a way that in this configuration as well, containers of adjacent conveying units cannot make contact.

FIG. 11 schematically shows the transition between the first configuration of the conveying units in section C and the second configuration of the conveying units in section A. If the transport of the conveying units takes place from left to right, in section B the holding devices supported on the suspension hook rotate about the rotational axis by overcoming the unstable intermediate state, as explained in conjunction with FIG. 6. The suspension hook, rotated by 90°, then engages in the new stable position. To initiate the rotation, for example a suitable actuator device may push against the holding device or the spacer elements.

If the transport takes place from right to left, the holding devices supported on the suspension hook in section C rotate about the rotational axis until the new stable configuration in section A is reached.

Figure 12:
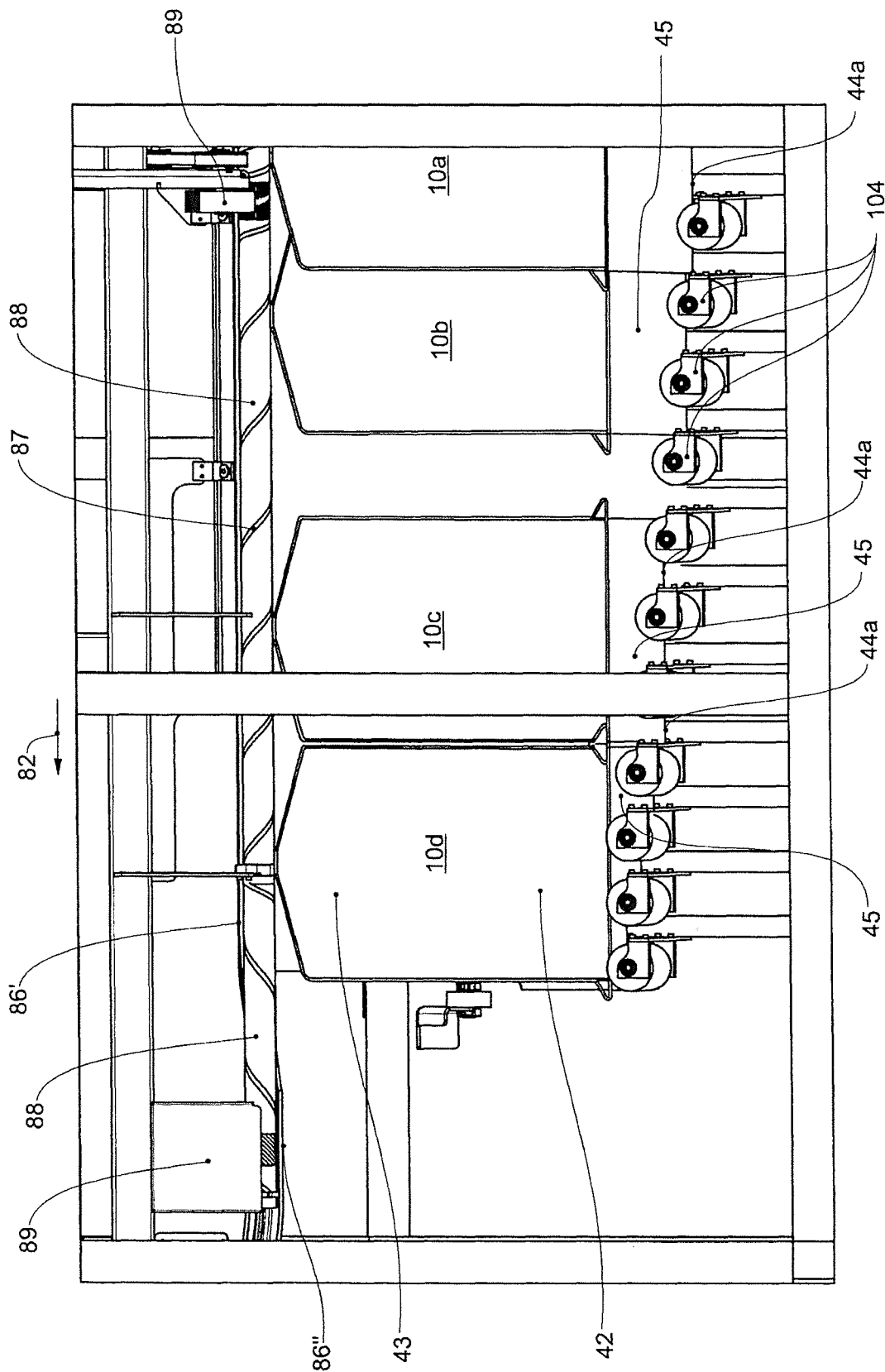
FIG. 12 schematically shows a side view of one advantageous embodiment of an opening device for opening transport bags of conveying units according to the invention in a conveying system.
Figure 13A:
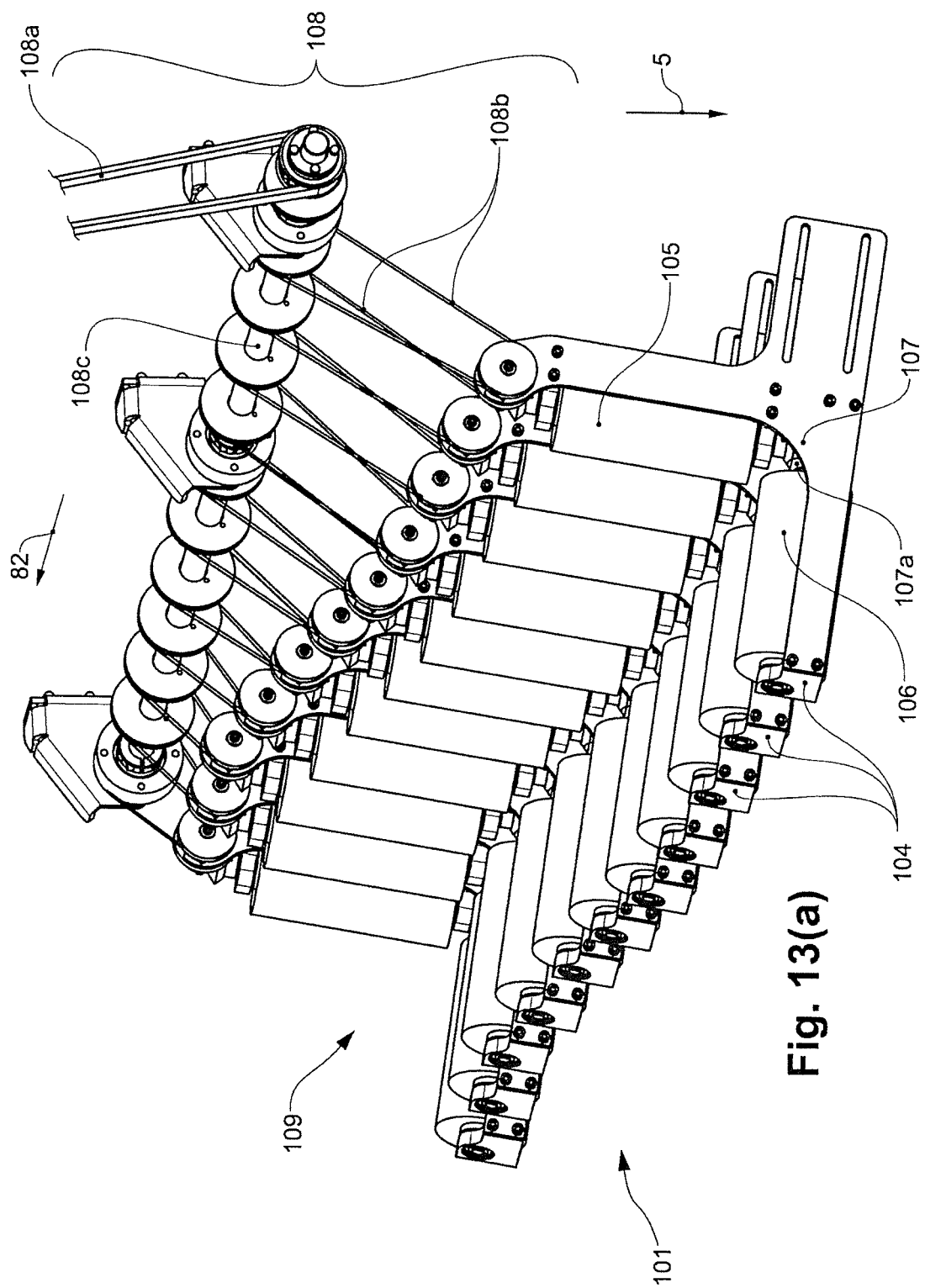
FIG. 13 schematically shows the opening device from FIG. 12 with omission of further parts of the facility and the conveying units, (a) in a perspective view and (b) in a side view.
Figure 13B:
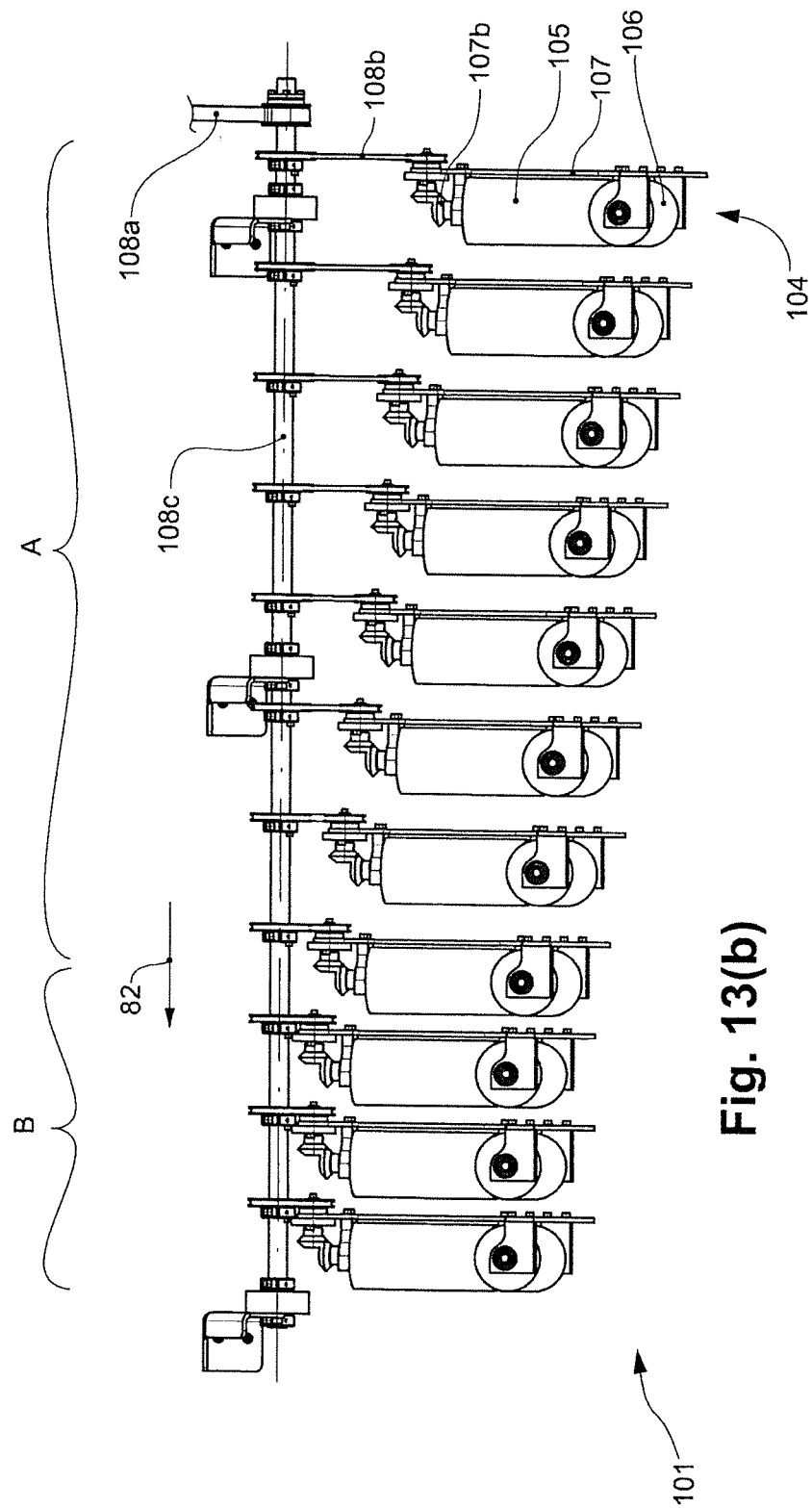

Another advantageous embodiment of a conveying system according to the invention is shown in FIGS. 12 and 13, with an advantageous opening device 101 for opening conveying units 10, in the form of transport bags, conveyed in the conveying system. The conveying units 10 essentially correspond to those from FIG. 5A.

A plurality of empty transport bags to be filled is provided in a staggered arrangement in a section of the conveying path not illustrated, as shown in FIG. 4, for example, or in some other way. In each case a conveying unit is released and transferred to a worm drive. The worm drive, as an external drive means for the conveying units, is made up of screw conveyors 88 with associated drive motors 89. The screw conveyors have a cylindrical body with a helical slot thereon which is used as a rotating operative connecting link slot 87 for a guide pin 29 of a carriage 20 of a conveying unit 10 situated therein. For a given rotational direction and rotational speed of the screw conveyor 88, the conveying speed of the carriage 20 on the rail 89, and thus, the speed of the transversal displacement of the conveying unit 10 along the conveying path 82, is determined by the slope of the connecting link slot 87. Thus, for example, in the exemplary embodiment shown, in an acceleration area of the worm drive at the right the slope of the connecting link slot continuously increases from right to left. For a constantly rapidly rotating screw conveyor 88, this results in a continuous acceleration of an initially vertical conveying unit 10. The conveying unit moves from right to left through the opening device 101 of the conveying system.

In the exemplary embodiment in FIG. 12, the rail 86' is rotated by 45° about the conveying axis with respect to the vertical in an area, not illustrated, to the right of the diagram and in the area of the opening device 101. For the conveying units 10, which correspond to those in FIG. 5A, this results in rotation of the carriage 20, and thus also of the support hooks 21, by 45° with respect to the vertical. In this orientation, for the corresponding support hooks there are two stable orientations of the transport bag: transverse to the conveying direction and parallel to the conveying direction.

The transport bags are transferred from the orientation transverse to the conveying direction into the parallel orientation, and provided in a staggered arrangement, by means that are not illustrated.

If an individual conveying unit (in FIG. 12, the conveying unit 10a) is now released from the staggered storage unit and received by the worm drive, the transport bag is thus already in a stable configuration in which the transport bag remains in the orientation parallel to the conveying direction without external action means.

After passing by the opening device, the rail 86' once again goes into a configuration in which it is rotated by 0° with respect to the vertical. In this area 86", the carriages 20 and the support hooks 21 are thus also rotated by 0° with respect to the vertical. In this configuration there is only one stable orientation of the transport bags in the support hook, namely, transverse to the conveying direction. Upon passing by the transition area of the rail between the areas 86' and 86", the transport bags (in FIG. 12, the conveying unit 10d) oriented parallel to the conveying direction 82 now rotate(s) automatically into what is now the only stable position, transverse to the conveying device. An additional operating device is not necessary.

The opening device 101 is illustrated in detail in FIG. 13. The opening device 101 includes a plurality of conveying and lifting units 104 that is in a staggered arrangement along the conveying path of the conveying units. A conveying and lifting unit 104 includes in each case a frame structure 107 on which two roller elements 105, 106 that are supported so as to be rotatable at an angle of essentially 90° are situated. The upper roller 105 and the lower roller 106 are operatively connected to a drive arrangement 108. In the exemplary embodiment shown, a shaft 108c of the drive arrangement is driven by a drive motor, not illustrated, via a primary drive belt 108a. The shaft 108c of the drive arrangement in turn drives the individual conveying and lifting units 104 via a plurality of secondary drive belts 108b. The secondary drive belt 108b drives the upper roller element 105 via an upper bevel gear 107a, and the upper roller element in turn drives the lower roller element 106 via a lower bevel gear 107b. The gear ratios of the components are selected in such a way that all rollers of all conveying and lifting units have the same rotational speed and the same rotational direction.

The drive of the roller elements 105, 106 may also be provided in some other way, for example via separate drives for the individual conveying and lifting units or the individual rollers, via separate drive shafts for the upper rollers and lower rollers, via a serial operative connection of the lower rollers 106 and upper rollers 105 with a spur gear, or combinations thereof.

If a conveying unit 10a is conveyed by the conveying drive all the way to the right into the area of the first conveying and lifting unit 104, the underlying edge 44a of the front wall 44 of the empty transport bag of the conveying unit 10 contacts the lower roller 106.

The individual conveying and lifting units 104 are situated in succession, with a gradual incline, in a first section A of the opening device 101. As a result, during the conveying of the conveying unit 10 the lower edge 44a of the transport bag is gradually pushed upwardly from right to left through section A (corresponding to conveying units 10a, 10b, 10c) via the successive lower rollers 106, while the remainder of the pocket, in particular the rear wall 42, does not interact with the rollers.

The roller elements 105, 106, only illustrated schematically, are advantageously designed as brush rollers, or alternatively are made of a relatively flexible foam material. The flexibility of the rollers minimizes the mechanical wear on the bags, and also ensures a low-vibration transition between successive rollers.

Due to the raising of the lower edge 44a of the front wall 44 of the transport bag, and thus of the front wall 44 itself, as a result of the operative connection 50, 51 with the rear wall 42 the front wall moves away from the rear wall in the direction of the upper roller elements 105. The pocket opening in the transport bag is continuously open up to a given, desired point.

The lower roller elements 106 and upper roller elements 105, situated at right angles relative to one another, are perpendicular to the conveying axis 82. The roller elements 105, 106 are slightly rotated about the conveying axis 82 with respect to the vertical 5, for example by an angle of 5-15°. The rotational speed of the rollers 105, 106 is adapted to the conveying speed of the conveying units in such a way that the tangential peripheral speed of the roller elements essentially corresponds to the conveying speed of the conveying units. In combination, this results in the formation of an ascending conveying and lifting channel 109 by the pair of rollers 105, 106, in which the pockets of the conveying units are reliably opened. In addition, the channel 109 stabilizes the transport bags, so that residual vibrations of the transport bag in the stable position on the support hook are suppressed in the transverse or longitudinal direction or about the vertical, even at high conveying speeds.

The height of the successive conveying and lifting units 104 no longer changes in a subsequent section B of the opening device 101. In this configuration, the transport bag of the conveying unit 10d may now be filled, for example by manually or automatically tossing a piece good unit into the continuously moving transport bag 10. For this purpose, the conveying unit may be slowed down by an appropriate configuration of the screw conveyor 88.

In the exemplary embodiment shown, three conveying and lifting units are situated in succession in section B. This number may also be larger, for example for higher conveying speeds, so that the transport bag may remain in the open state for a longer time.

When a conveying unit 10d leaves the opening device 101 at the end of the second section B, the support of the front wall 44 is discontinued. The front wall drops downwardly due to its own weight and the weight of the introduced load, provided that the volume of the load allows this. The conveying unit concurrently or subsequently leaves the area 86' of the rail and goes into the area 86", as the result of which the transport bag swivels into the orientation transverse to the conveying direction, in which it may be conveyed, buffered, and stored in a space-saving manner.

The scope of the present invention is not limited to the specific embodiments described herein. Rather, the description and the associated figures, in addition to the examples disclosed herein, result in various further modifications of the present invention for those skilled in the art, which likewise are encompassed by the protective scope of the claims. Furthermore, various references are cited in the description, the disclosed content of which is hereby fully incorporated by reference into the description.

It is claimed:

1. A conveying system for the guided suspended transport of transport elements in particular transport bags and/or clothes hanger elements, along a conveying path, having at least one conveying unit for transporting transport elements in a suspended manner in a conveying system, in particular a rail-guided conveying system or a conveyor chain system, comprising:
a support hook that is mounted on a conveying element, a transport element, and a suspension hook that is mounted on the transport element, wherein the suspension hook is supported in the support hook in a suspended manner; wherein the support hook is configured so that the suspension hook assumes at least two stable positions in the support hook, wherein the suspension hook in a first stable position is rotated by an angle relative to the suspension hook into a second stable position;
wherein opening means are provided via which a transport bag may be brought into the first open state at a given location on the conveying path, with the suspension hook in the second position and the rear wall of the transport bag oriented essentially parallel to the conveying direction;
wherein as an opening means at least one of a lifting arrangement, a lifting table, and a ramp arrangement is provided, or an opening device comprising a plurality of staggered conveying and lifting devices having a lower roller element, so that the lower roller elements of the opening device form an ascending ramp.

2. The conveying system according to claim 1, wherein the suspension hook is transferable back and forth between the first stable position and the second stable position in such a way that the suspension hook continuously rests on the support hook.

3. The conveying system according to claim 1, wherein the support hook has a first bearing segment and a second bearing segment; in the first stable position the suspension hook rests on the first segment, and in the second stable position rests on the second segment, and situated between the first segment and the second segment is a connecting segment on which the suspension hook is slidingly transferable back and forth between the first stable position and the second stable position.

4. The conveying system according to claim 1, wherein the support hook has a first bearing segment and a second bearing segment;
wherein the support hook is configured so that in a given first spatial orientation of the support hook, the suspension hook may assume a first stable position on the first bearing segment, in which the suspension hook is oriented in a first plane; and in a given second spatial orientation of the support hook, which may be the same as or different from the first spatial orientation, the suspension hook may assume a second stable position on the second bearing segment, in which the suspension hook is oriented in a second plane;
wherein the suspension hook is transferable back and forth between the first position and the second position.

5. The conveying system according to claim 4, wherein the support hook is configured so that in a given spatial orientation of the support hook, the suspension hook may assume the first stable position on the first bearing segment, in which the suspension hook is oriented in the first plane; and in the same spatial orientation of the support hook, the suspension hook may assume the second stable position on the second bearing segment, in which the suspension hook is oriented in the second plane, wherein the first position and the second position correspond to local minima of potential energy of the transport element that is supported in a suspended manner, and wherein the suspension hook is transferable back and forth between the first stable position and the second stable position by rotating the suspension hook about a given rotational angle.

6. The conveying system according to claim 4, wherein the support hook is configured so that in a given first spatial orientation of the support hook, the suspension hook may assume the first stable position on the first bearing segment, in which the suspension hook is oriented in the first plane; and in a second spatial orientation of the support hook that is different from the given first spatial orientation, the suspension hook may assume the second stable position on the second bearing segment, in which the suspension hook is oriented in the second plane, wherein in the given first spatial orientation of the support hook, the first position corresponds to a minimum of potential energy of the transport element that is supported in a suspended manner; in the given second spatial orientation of the support hook, the second position corresponds to a minimum of potential energy of the transport element that is supported in a suspended manner, and the suspension hook is transferable back and forth between the first position and the second position by rotating the support hook about a given rotational angle.

7. The conveying system according to claim 6, wherein the suspension hook is transferable back and forth between the first position and the second position by rotating the conveying element about the conveying direction.

8. The conveying system according to claim 4, wherein the support hook is configured so that in a given first spatial orientation of the support hook, the suspension hook may assume the first stable position on the first bearing segment, in which the suspension hook is oriented in the first plane; and in a second spatial orientation of the support hook that is different from the given first spatial orientation, the suspension hook may assume the first stable position on the first bearing segment, in which the suspension hook is oriented in the first plane, and may also assume the second stable position on the second bearing segment, in which the suspension hook is oriented in the second plane, wherein in the given first spatial orientation of the support hook, the first position corresponds to a minimum of potential energy of the transport element that is supported in a suspended manner, and wherein in the second spatial orientation, the first position and the second position correspond to local minima of potential energy of the transport element that is supported in a suspended manner, and wherein the suspension hook is transferable back and forth between the first stable position and the second stable position by rotating the suspension hook about a given rotational angle.

9. The conveying system according to claim 8, wherein the suspension hook is transferable from the second position into the first position by rotating the conveying element about the conveying direction.

10. The conveying system according to claim 1, wherein the transport bag includes a rear wall and a front wall that are flexibly joined together via a base section in such a way that they are movable back and forth between a first state in which they form a pocket that is open and fillable at the top, and a second state in which they are situated close together and form a folded-up bag, wherein the rear wall is extended upwardly beyond the level of the front wall, with a support section for fastening the transport bag to the conveying element, and wherein the suspension hook is mounted on an upper end of the support section.

11. The conveying system according to claim 10, wherein the transport bag has opening means that can automatically bring the transport bag into the first state and hold it there.

12. The conveying system according to claim 10, wherein at least one spacer element is situated between the front wall and the rear wall of the transport bag and is pivotably connected to the front wall and the rear wall, respectively, wherein the at least one spacer element is designed and arranged in such a way that when the pocket is empty, the transport bag automatically goes from the first state into the second state by gravity.

13. The conveying system according to claim 12, wherein the transport bag may be brought from the second state into the first state by raising the front wall.

14. The conveying system according to claim 12, wherein a spacer element is situated between the front wall and the rear wall of the transport bag, at a lower end of the front wall and at an upper end of the front wall, on both sides in each case, and is pivotably connected to the front wall and the rear wall, respectively.

15. The conveying system according to claim 12, wherein the spacer elements have a bend that is directed away from the pocket interior.

16. The conveying system according to claim 12, wherein the transport element has at least one stop bracket on a rear wall that prevents or hinders swiveling of a spacer element beyond the plane, formed by the rear wall, on the side of the rear wall facing away from the front wall.

17. The conveying system according to claim 1, wherein the transport element has at least one second hook.

18. The conveying system according to claim 1, wherein the transport element is at least one of a clothes hanger, a suspended clothes hanger, and a clamping bracket.

19. The conveying system according to claim 1, wherein the transport element is a device for holding two or more containers.

20. The conveying system according to claim 19, wherein an operative arrangement is provided, via which the transport elements are rotated about a given rotational angle at a given location on the conveying path, so that the suspension hook is transferred from the first position into the second position, or from the second position into the first position.

21. The conveying system according to claim 20, wherein at least one of a brush arrangement, a mechanical, an electrical, a magnetic, and a pneumatic actuating means is provided as an operative arrangement.

22. The conveying system according to claim 1, wherein a first plane, in which the suspension hook is oriented in the first stable position, is essentially transverse to the conveying direction; and a second plane, in which the suspension hook is oriented in the second stable position, is essentially parallel to the conveying direction.

23. The conveying system according to claim 1, wherein in one given section of the conveying path the support hook of the conveying unit is oriented in such a way that the suspension hook of the transport element assumes a first stable position, and in another given section the support hook of the conveying unit is oriented in such a way that the suspension hook of the transport element assumes a second stable position.

24. The conveying system according to claim 23, wherein transferring the suspension hook from the first stable position into the second stable position, or from the second stable position into the first stable position, is initiated by rotating the conveying element about the conveying direction during the transition between the one given section and the other given section of the conveying path.

25. The conveying system according to claim 1, wherein the conveying and lifting devices have an upper roller element, so that the lower roller elements and the upper roller elements of the opening device form a conveyor channel.

26. The conveying system according to claim 1, wherein the lower roller elements and/or the upper roller elements of the conveying and lifting units are actively driven.

27. The conveying system according to claim 1, wherein the lower roller elements and the upper roller elements of the conveying and lifting units are arranged at an angle between 75° and 105° relative to one another, and perpendicular to the conveying direction.

28. The conveying system according to claim 27, wherein the lower roller elements are inclined with respect to the horizontal by an angle between 5° and 30°.

29. The conveying system according to claim 1, wherein the opening means includes a lower belt conveyor situated in a ramp-shaped manner.

30. The conveying system according to claim 29, wherein the opening means includes an upper belt conveyor, so that the lower belt conveyor and the upper belt conveyor form a conveyor channel.

31. The conveying system according to claim 1, having a device for introducing piece good units into the open pocket of the transport bag.

32. The conveying system according to claim 1, wherein a plurality of transport elements may be provided in a staggered arrangement in a provision section of the conveying path.

33. The conveying system according to claim 1 which is configured so that a plurality of transport elements may be provided in a staggered arrangement on a given section of the conveying path.

34. A method for introducing piece goods into transport elements of a conveying system, comprising the steps:
   providing a conveying system for the guided suspended transport of transport elements in particular transport bags and/or clothes hanger elements, along a conveying path, having at least one conveying unit for transporting transport elements in a suspended manner in a conveying system, in particular a rail-guided conveying system or a conveyor chain system, including:
      a support hook that is mounted on a conveying element, a transport element, and a suspension hook that is mounted on the transport element, wherein the suspension hook is supported in the support hook in a suspended manner; wherein the support hook is configured so that the suspension hook assumes at least two stable positions in the support hook, wherein the suspension hook in a first stable position is rotated by an angle relative to the suspension hook into a second stable position;
   wherein opening means are provided via which a transport bag may be brought into the first open state at a given location on the conveying path, with the suspension hook in the second position and the rear wall of the transport bag oriented essentially parallel to the conveying direction;
   wherein as an opening means at least one of a lifting arrangement, a lifting table, and a ramp arrangement is provided, or an opening device comprising a plurality of staggered conveying and lifting devices having a lower roller element, so that the lower roller elements of the opening device form an ascending ramp;

supplying a conveying unit of the conveying system along the conveying path, with the suspension hook of the transport element in the first stable position;

transferring the suspension hook of the transport element of the stated conveying unit from the first stable position into the second stable position;

introducing at least one piece good unit into the ready-to-receive transport element of the stated conveying unit; and transferring the suspension hook of the stated transport element from the second stable position into the first stable position.

35. The method according to claim 34, wherein the support hook has a first bearing segment and a second bearing segment;

wherein the support hook is configured so that in a given first spatial orientation of the support hook, the suspension hook may assume a first stable position on the first bearing segment, in which the suspension hook is oriented in a first plane; and in a given second spatial orientation of the support hook that is different from the given first spatial orientation, the suspension hook may assume the first stable position on the first bearing segment, in which the suspension hook is oriented in the first plane, and may also assume a second stable position on the second bearing segment, in which the suspension hook is oriented in a second plane;

wherein in the given first spatial orientation of the support hook, the first position corresponds to a minimum of potential energy of the transport element that is supported in a suspended manner;

wherein in the second spatial orientation, the first position and the second position correspond to local minima of potential energy of the transport element that is supported in a suspended manner;

wherein the suspension hook is transferable back and forth between the first stable position and the second stable position by rotating the suspension hook about a given rotational angle; and wherein the suspension hook is transferable from the second position into the first position by rotating the conveying element about the conveying direction; wherein in the first position of the suspension hook the rear wall of the transport bag is oriented essentially transversely with respect to the conveying direction; and wherein in the second position of the suspension hook the rear wall of the transport bag is oriented essentially parallel to the conveying direction.

36. The method according to claim 34 wherein prior to introducing a piece good unit into the pocket of the transport bag of a conveying unit, the transport bag is transferred from the second state into the first state.

37. The method according to claim 34, wherein a plurality of transport bags is provided in a staggered arrangement.

38. A method for visually inspecting garments hung on clothes hanger transport elements of a conveying system or containers held in container holding devices of a conveying system, comprising the steps:

providing a conveying system for the guided suspended transport of transport elements, wherein the transport element of the at least one conveying unit is a clothes hanger transport element or a container holding device transport element, along a conveying path, having at least one conveying unit for transporting transport elements in a suspended manner in a conveying system, in particular a rail-guided conveying system or a conveyor chain system, including:

a support hook that is mounted on a conveying element, a transport element, and a suspension hook that is mounted on the transport element, wherein the suspension hook is supported in the support hook in a suspended manner; wherein the support hook is configured so that the suspension hook assumes at least two stable positions in the support hook, wherein the suspension hook in a first stable position is rotated by an angle relative to the suspension hook into a second stable position;

wherein opening means are provided via which a transport bag may be brought into the first open state at a given location on the conveying path, with the suspension hook in the second position and the rear wall of the transport bag oriented essentially parallel to the conveying direction;

wherein as an opening means at least one of a lifting arrangement, a lifting table, and a ramp arrangement is provided, or an opening device comprising a plurality of staggered conveying and lifting devices having a lower roller element, so that the lower roller elements of the opening device form an ascending ramp;

supplying a conveying unit of the conveying system along the conveying path, with the suspension hook of the clothes hanger transport element or the container holding device transport element in the first stable position;

transferring the suspension hook of the clothes hanger transport element or of the container holding device transport element of the stated conveying unit from the first stable position into the second stable position;

visually inspecting the front side and/or rear side of a garment hung on the clothes hanger transport element or a container held in the container holding device of the transport element; and transferring the suspension hook of the clothes hanger transport element or of the container holding device transport element from the second stable position into the first stable position.

39. The method according to claim 38, wherein in the first position of the suspension hook the clothes hanger transport element or the container holding device transport element is oriented essentially transversely with respect to the conveying direction; and wherein in the second position of the suspension hook the clothes hanger transport element or the container holding device transport element is oriented essentially parallel to the conveying direction.

40. The method according to claim 38, wherein prior to the visual inspection of the front side and/or rear side of a garment hung on the clothes hanger transport element, or of a container held on the container holding device of the transport element, the clothes hanger transport element or the container holding device transport element is transferred from the second state into the first state.

\* \* \* \* \*